(12) United States Patent
He et al.

(10) Patent No.: US 10,536,707 B2
(45) Date of Patent: *Jan. 14, 2020

(54) POWER AWARE VIDEO DECODING AND STREAMING

(71) Applicant: VID SCALE, Inc., Wilmington, DE (US)

(72) Inventors: Yuwen He, San Diego, CA (US); Yan Ye, San Diego, CA (US); Yong He, San Diego, CA (US); George W. McClellan, Bensalem, PA (US); Eun Seok Ryu, Gangnam-gu (KR)

(73) Assignee: VID Scale, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,227

(22) Filed: Nov. 20, 2018

(65) Prior Publication Data

US 2019/0158855 A1 May 23, 2019

Related U.S. Application Data

(63) Continuation of application No. 13/937,678, filed on Jul. 9, 2013, now Pat. No. 10,154,258.

(Continued)

(51) Int. Cl.
*H04N 19/187* (2014.01)
*H04L 29/06* (2006.01)
(Continued)

(52) U.S. Cl.
CPC ........... *H04N 19/187* (2014.11); *G06F 1/329* (2013.01); *G06F 1/3212* (2013.01);
(Continued)

(58) Field of Classification Search
CPC .......... H04L 67/00; H04L 65/00; H04W 4/00; H04N 21/4424
See application file for complete search history.

(56) References Cited

U.S. PATENT DOCUMENTS

| 5,949,484 A | 9/1999 | Nakaya et al. |
| 7,456,760 B2 | 11/2008 | Normile et al. |

(Continued)

FOREIGN PATENT DOCUMENTS

| CN | 102450014 A | 5/2012 |
| JP | 2006-197186 A | 7/2006 |

(Continued)

OTHER PUBLICATIONS

Power and content aware video encoding for video communication over wireless networks; Liang; 2004. (Year: 2004).*

(Continued)

*Primary Examiner* — Luis Perez-Fuentes
(74) *Attorney, Agent, or Firm* — Condo Roccia Koptiw LLP

(57) ABSTRACT

Methods and systems are disclosed for a mobile device to decode video based on available power and/or energy. For example, the mobile device may receive a media description file (MDF) from for a video stream from a video server. The MDF may include complexity information associated with a plurality of video segments. The complexity information may be related to the amount of processing power to be utilized for decoding the segment at the mobile device. The mobile device may determine at least one power metric for the mobile device. The mobile device may determine a first complexity level to be requested for a first video segment based on the complexity information from the MDF and the power metric. The mobile device may dynamically alter the decoding process to save energy based on the detected power/energy level.

20 Claims, 18 Drawing Sheets

Related U.S. Application Data

(60) Provisional application No. 61/669,581, filed on Jul. 9, 2012.

(51) Int. Cl.

| | | |
|---|---|---|
| *G06F 1/3212* | (2019.01) | |
| *G06F 1/329* | (2019.01) | |
| *H04N 19/117* | (2014.01) | |
| *H04N 19/127* | (2014.01) | |
| *H04N 19/136* | (2014.01) | |
| *H04N 19/156* | (2014.01) | |
| *H04N 19/44* | (2014.01) | |
| *H04N 21/2343* | (2011.01) | |
| *H04N 21/414* | (2011.01) | |
| *H04N 21/442* | (2011.01) | |
| *H04N 21/845* | (2011.01) | |
| *H04N 21/854* | (2011.01) | |

(52) U.S. Cl.
CPC ...... *H04L 65/4084* (2013.01); *H04L 65/4092* (2013.01); *H04N 19/117* (2014.11); *H04N 19/127* (2014.11); *H04N 19/136* (2014.11); *H04N 19/156* (2014.11); *H04N 19/44* (2014.11); *H04N 21/23439* (2013.01); *H04N 21/41407* (2013.01); *H04N 21/4424* (2013.01); *H04N 21/8456* (2013.01); *H04N 21/85406* (2013.01); *Y02D 10/174* (2018.01); *Y02D 10/24* (2018.01)

(56) References Cited

U.S. PATENT DOCUMENTS

| | | | |
|---|---|---|---|
| 8,045,616 B2 | 10/2011 | Sekiguchi et al. | |
| 8,315,466 B2 | 11/2012 | El-Maleh et al. | |
| 8,621,542 B2 | 12/2013 | Klamer et al. | |
| 8,625,680 B2 * | 1/2014 | Srinivasan | H04N 19/00 375/240.27 |
| 8,938,767 B2 | 1/2015 | Chen et al. | |
| 8,958,485 B2 * | 2/2015 | Chen | H04L 29/08 375/240.26 |
| 8,973,057 B2 | 3/2015 | Cedervall et al. | |
| 9,002,826 B2 | 4/2015 | Rabii | |
| 9,015,564 B2 | 4/2015 | Luby et al. | |
| 9,043,797 B2 | 5/2015 | Rabii | |
| 9,246,842 B2 | 1/2016 | Oyman et al. | |
| 9,432,664 B2 | 8/2016 | Wang | |
| 10,063,921 B2 * | 8/2018 | He | H04N 21/4424 |
| 2008/0084491 A1 | 4/2008 | He et al. | |
| 2008/0137753 A1 | 6/2008 | He | |
| 2008/0216125 A1 * | 9/2008 | Li | H04N 21/4122 725/62 |
| 2009/0017860 A1 | 1/2009 | Cole | |
| 2009/0270138 A1 | 10/2009 | Raveendran | |
| 2010/0166060 A1 | 7/2010 | Ezure et al. | |
| 2010/0254451 A1 | 10/2010 | Melnyk et al. | |
| 2011/0093605 A1 * | 4/2011 | Choudhury | H04L 65/4084 709/231 |
| 2011/0194602 A1 | 8/2011 | Andersson et al. | |
| 2012/0110036 A1 | 5/2012 | Rabii | |
| 2012/0127003 A1 | 5/2012 | Shibahara et al. | |
| 2012/0250764 A1 | 10/2012 | Martin et al. | |
| 2013/0073507 A1 | 3/2013 | Sera | |
| 2013/0227122 A1 | 8/2013 | Gao et al. | |
| 2013/0290493 A1 | 10/2013 | Oyman et al. | |
| 2013/0329777 A1 * | 12/2013 | Konda | H04L 67/04 375/240.01 |
| 2014/0010282 A1 * | 1/2014 | He | H04N 21/23439 375/240.02 |
| 2014/0136653 A1 | 5/2014 | Luby et al. | |
| 2014/0156863 A1 | 6/2014 | Gao et al. | |

FOREIGN PATENT DOCUMENTS

| | | |
|---|---|---|
| JP | 2007-306538 A | 11/2007 |
| JP | 2011-077721 A | 4/2011 |
| JP | 2011-078182 A | 4/2011 |
| JP | 2011-254653 A | 12/2011 |
| JP | 2012-048505 A | 3/2012 |
| JP | 2013-509040 A | 3/2013 |
| KR | 10-2009-0075681 A | 7/2009 |
| TW | 201101846 A | 1/2011 |
| TW | 201132129 A | 9/2011 |
| WO | WO 2005/069108 A1 | 7/2005 |
| WO | WO 2008/045633 A2 | 4/2008 |
| WO | WO 2009/009166 A1 | 1/2009 |
| WO | WO 2011/038034 A1 | 3/2011 |
| WO | WO 2011/047335 A1 | 4/2011 |
| WO | WO 2011/084913 A2 | 7/2011 |
| WO | WO 2012/058172 A1 | 5/2012 |

OTHER PUBLICATIONS

ISO-IEC 23009-1—Dynamic adaptive Streaming over HTTP—DASH; 2012 (Year: 2012).*
Dynamic Adaptive Streaming over HTTP; 2012. (Year: 2012).*
Google Search for NPL; 2019 (Year: 2019).*
3rd Generation Partnership Project(3GPP), TS 26.234 V9.6.0, "Technical Specification Group Services and System Aspects, Transparent End-to-End Packet-Switched, Streaming Service (PSS), Protocols and Codecs (Release 9)", Mar. 2011, pp. 1-189.
ACM, "Welcome to MoVid 2014", 6th ACM Workshop on Mobile Video, In Connection with ACM Multimedia Systems Conference, Document Available at: http://eecs.ucl.edu/movid/, Mar. 19, 2014, 1 page.
Adobe, "HTTP Dynamic Streaming on the Adobe Flash Platform", Adobe Flash Platform Technical White Paper, 2011, 18 pages.
Asbun et al. "Method and Apparatus for Adaptive Sampling of Video with Bandwidth Adaptive Streaming over HTTP", InterDigital Invention Disclosure 11129, Jun. 2011.
Bossen, Frank, "On Software Complexity", DOCOMO Innovations, Inc., Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-7.
Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, 9th Meeting: Geneva, CH, Document No. JCTVC-I1003_d1, Apr. 27-May 7, 2012, 273 pages.
Carroll, Aoron, "An Analysis of Power Consumption in a Smartphone", NICTA and University of New South Wales, USENIX Annual Technical Conference, 2010, pp. 1-14.
Chanawangsa et al., "A New Smartphone Lane Detection System: Realizing True Potential of Multi-core Mobile Devices", Chapel Hill, North Carolina, USA, Feb. 24, 2012, 6 pages.
Cho et al, "A Combined Approach for QoS-Guaranteed and Low-Power Video Decoding", Consumer Electronics, IEEE Transactions on vol. 57, Issue: 2, May 2011, pp. 651-657.
Cisco, "Optimizing Enterprise Video Over Wireless LAN", White Paper, 2010, pp. 1-11.
Deshpande et al. "System Level Power Allocation Algorithm for Mobile Devices for Full Playback Guarantee", IMMPD, 11, Sharp Laboratories of America, Camas, Nov. 29, 2011, pp. 19-20.
Hsu et al. "Comp2Watch: Enhancing the Mobile Video Browsing Experience", Communication & Multimedia Lab, National Taiwan University, Taipei, Taiwan, Nov. 29, 2011, 6 pages.
ISO/IEC, "Information Technology—Dynamic Adaptive Streaming Over HTTP (DASH)—Part 1: Media Presentation Description and Segment Formats", ISO/IEC 23009-1, Apr. 1, 2012, 134 pages.
ITU-T, "Advanced Video Coding for Generic Audiovisual Services", Series H: Audiovisual and Multimedia Systems, ITU-T H.264, Telecommunication Standardization Sector of ITU, Nov. 2007, 564 pages.
Jain et al., "Mobile Cloud Media Computing 2010", An ACM Multimedia 2010 Satellite Workshop, Document Available at: <https://

(56) References Cited

OTHER PUBLICATIONS sites.google.com/site/mobilecloudmedia/program>, Retrieved on Oct. 21, 2013, Oct. 29, 2010, 2 pages.

Jiang et al. "The Second International Workshop on Mobile Multimedia Processing", Mobile Multimedia Processing Workshop, WMMP, Istanbul, Turkey, Aug. 22, 2010, 100 pages.

Kannur et al., "Power-Aware Content-Adaptive H.264 Video Encoding", IEEE International Conference on Acoustics, Speech and Signal Processing, Taipei, Apr. 19-24, 2009, pp. 925-928.

Kiess et al. "SeamCrop: Changing the Size and Aspect Ratio of Videos", Department of Computer Science IV, University of Mannheim, Germany, Feb. 24, 2012, pp. 13-18.

Liang et al., "Power and Content Aware Video Encoding for Video Communication Over Wireless Networks", IEEE Workshop onSignal Processing Systems, Austin, TX, Oct. 2004, pp. 269-274.

Lu et al., "Modelling Power Consumption of a H.263 Video Encoder", Modelling Power Consumption of a H.263 Video Encoder, May 2004, pp. 77-80.

Luo, "International ACM Workshop on Interactive Multimedia on Mobile and Portable Devices (IMMPD'11)", Half Day Workshops, Document Available at: <http://www.seeacmmm11.org/content-immpd11.html>, Nov. 29, 2011, 1 page.

Luthra, Ajay, "Requirements for the Scalable Enhancement of HEVC", ISO/IEC JTC-1/SC29/WG11 M24484, Apr. 2012.

Microsoft, "Smooth Streaming", IIS, Microsoft Support Downloads, Document Available at: < http://www.iis.net/download/smoothstreaming>, Retrieved on Oct. 21, 2013, 2 pages.

Ohm, Jens-Rainer, "Advances in Scalable Video Coding", Institute of Commun. Eng., Aachen University of Technology, Germany, Proceedings of IEEE, vol. 93, Issue 1, Jan. 2005, pp. 42-56.

Pang et al. "Mobile Interactive Region-of-Interest Video Streaming with Crowd-Driven Prefetching", IMMPD'11, Department of Electrical Engineering, Stanford University, Stanford, CA, Nov. 29, 2011, pp. 7-12.

Pantos R., "HTTP Live Streaming", Apple Inc., Internet-Draft, Mar. 31, 2011, pp. 1-25.

Petrova, Krassie, "Mobile Learning as a Mobile Business Application", Int. J. Innovation and Learning, vol. 4, No. 1, 2007, pp. 1-13.

Riiser et al. "A Comparison of Quality Scheduling in Commercial Adaptive HTTP Streaming Solutions on a 3G Network", Netview Technology AS, MoVid'12, Feb. 24, 2012, 6 pages.

Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.

Song et al., "Low-Power Video Decoding System Using a Reconfigurable Processor", Consumer Electronics (ICCE), 2012 IEEE International Conference on, Jan. 13-16, 2012, pp. 532-533.

Stockhammer, Thomas, "Dynamic Adaptive Streaming over HTTP—Standards and Design Principles", Feb. 2011, 11 pages.

Sueur et al., "Dynamic Voltage and Frequency Scaling: The Laws of Diminishing Returns", NICTA and University of New South Wales, 2010, pp. 1-5.

Tamai et al., "Energy-Aware Video Streaming with QoS Control for Portable Computing Devices", NOSSDAV'04, Cork, Ireland, Jun. 16-18, 2004, pp. 68-73.

Wang et al. "Multimedia Streaming via TCP: An Analytic Performance Study", ACM Transactions on Multimedia Computing, Communications and Applications, vol. 4, No. 2, Article 16, May 2008, pp. 1-22.

Wikipedia, "HTML5", Document Available at: <http://en.wikipedia.org/wiki/HTML5>, Retrieved on Oct. 21, 2013, pp. 1-10.

Wikipedia, "Oganic Computing", Document Available at: <http://en.wikipedia.org/wiki/Organic_computing>, Retrieved on Oct. 21, 2013, 3 pages.

* cited by examiner

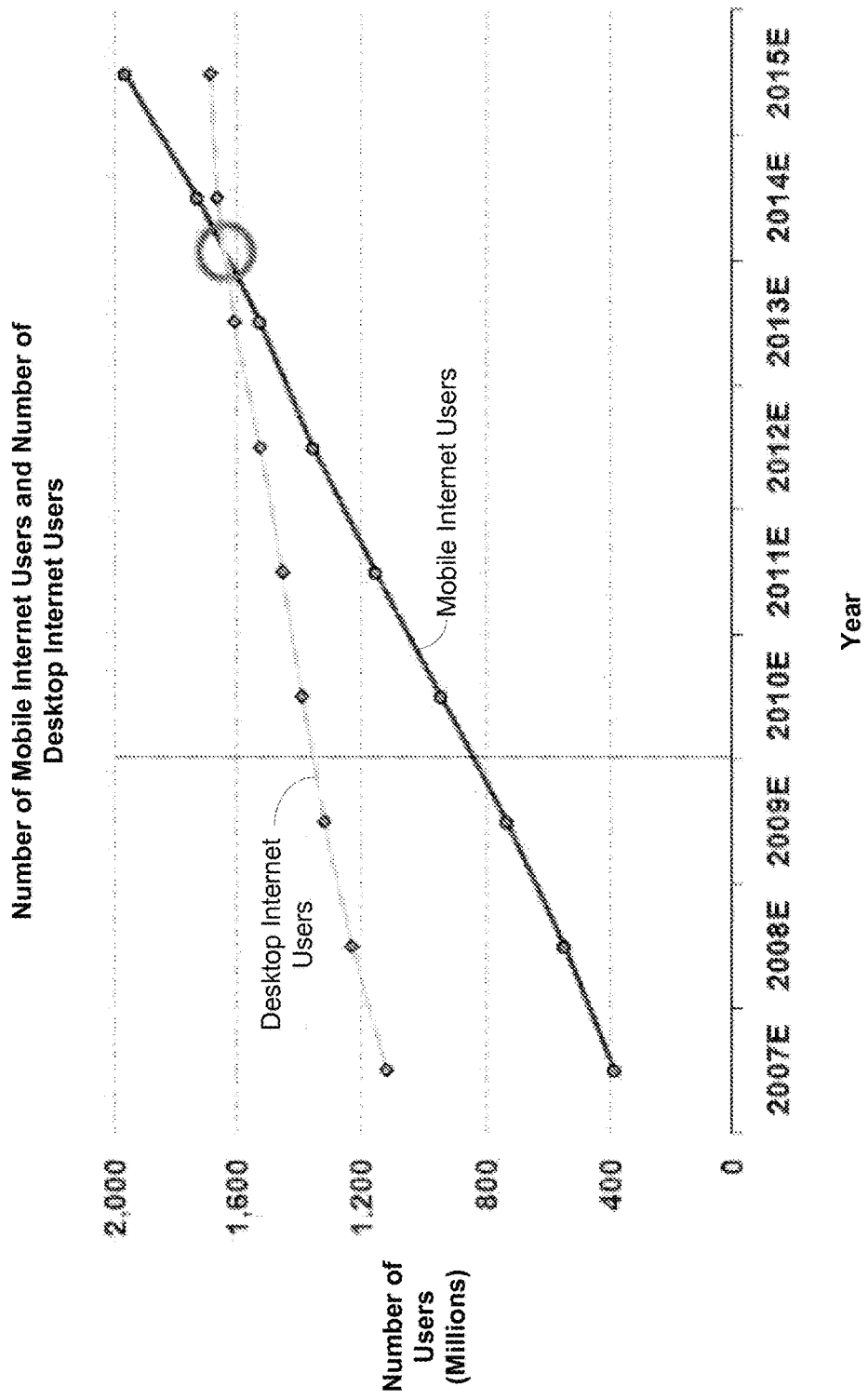

POWER AWARE VIDEO DECODING AND STREAMING

CROSS-REFERENCE TO RELATED APPLICATIONS

This application is a continuation application of U.S. Non-Provisional application Ser. No. 13/937,678, filed Jul. 9, 2013, which claims the benefit of U.S. Provisional Patent Application No. 61/669,581, filed Jul. 9, 2012, the contents of which are hereby incorporated by reference in their entirety.

BACKGROUND

As the proliferation of mobile devices continues to increase, they are being used for a larger variety of applications. Additionally, mobile devices such as smartphones are utilizing more and more complex functionality. Such increases in processing may increase power consumption, which can adversely affect the user experience in power limited situations such as when a battery is the power source for the device.

SUMMARY

Methods and systems are disclosed for a mobile device to decode video based on available power and/or energy. For example, the mobile device may receive a media description file (MDF) for a video stream from a video server. The MDF may include complexity information associated with a plurality of video segments. The complexity information may be related to the amount of processing power to be utilized for decoding the segment at the mobile device. The mobile device may determine at least one power metric for the mobile device. For example, the power metric may be an amount of energy remaining for a current power source such as a battery. The mobile device may determine a first complexity level to be requested for a first video segment based on the complexity information from the MDF and the power metric. The mobile device may request the first video segment at the first complexity level form the video server.

For example, the complexity information in the MDF may be provided per video segment. Examples of power metrics that may be used to determine the appropriate complexity level to request may include the amount of energy to be allocated for decoding the remainder of the video, the amount of energy used for a previous decoding, statistics collected at the mobile device regarding previously decoded segments, cost information in the form of a ratio of power utilized for decoding to the quality of the segment, cost information in the form of a ratio of power utilized to the complexity of the segment, and/or the like. The mobile device may determine a duration of the remainder of the video stream, and may determine a duration of the first video segment. The mobile device may then determine an amount of energy to be allocated to the first video segment based on the amount of energy to be allocated for decoding the remainder of the video stream, the duration of the remainder of the video stream, and the duration of the first video segment. The mobile device may make the determination based on the assumption that each segment that remains in the video stream will be allocated an equal amount of energy for decoding. The sum of the energies allocated for each of the remaining segments may be less than or equal to the total power allocated for completing the decoding of the video.

The mobile device may determine the first complexity level to be requested for the first video segment based on the complexity information from the MDF and the power metric by determining a complexity level that will result in a decoding the first video segment using approximately the amount of energy to be allocated to the first video segment. For example, the complexity levels may be quantized, and the mobile device may select that most complex level that meets a desired power use goal. The mobile device may determine the first complexity level to be requested for the first video segment based on the complexity information from the MDF and the power metric by selecting the first complexity level based on a power allocated for a previous segment, a complexity level used to decode the previous segment, and a power allocated for decoding the first video segment.

The mobile device may autonomously or in conjunction with the network adjust the decoding process to save energy while limiting the introduction of decoding errors. For example, the mobile device may determine whether a region of the first video segment includes high frequency components that exceed a high frequency threshold. The mobile device may apply a first interpolation filter during motion compensation for the region on condition that the high frequency components exceed the high frequency threshold, or the mobile device may apply a second interpolation filter for motion compensation for the region on condition that the high frequency components do not exceed the high frequency threshold. The second interpolation filter may be associated with shorter taps (e.g., a lower cutoff frequency) than the first interpolation filter, thus limiting memory access and saving power. The mobile device may determine not to apply the filter with shorter taps (e.g., a lower cutoff frequency) even if there are few high frequency components based on determining that the region is a reference for other regions, meaning that the chance of propagating an error is higher. The mobile device may perform deblocking for reference pictures in the first video segment, and may refrain from performing deblocking for non-reference pictures.

A mobile device or other wireless transmit receive unit may include one or more functional components for dynamically altering video decoding based on power conditions. For example, the mobile device may include a transceiver that may be configured to request a MDF for a video file from a video server and to receive the MDF from the video server. The wherein the MDF may include complexity information for a plurality of video segments. The mobile device may include a complexity statistics and control unit that may be configured to store statistics for previous segment decoding. For example, the statistics for previous segment decoding may include power information associated with decoding at least one previous segment and complexity information for the at least on previous segment. The mobile device may include a power detector that may be configured to determine current energy level or power level information. The mobile device may include a power aware adaption controller that may be configured to determine a complexity level to request for a subsequent segment based on the complexity information from the MDF, the statistics for the previous segment decoding, and the current power information. The mobile device may include a decoder configured to determine a parameter or method to apply for decoding the subsequent segment based on information determined by the power aware adaption controller.

For example, the decoder is configured to determine an interpolation filter to apply for motion compensation of a given region based on a frequency analysis of a sampling of pixels within the given region. The decoder may be configured to utilize a first interpolation filter with shorter taps (e.g., a lower cutoff frequency) than a second interpolation filter for higher layer temporal prediction for regions with high frequency components below a specified threshold, and use the second interpolation filter for lower layer temporal prediction even if high frequency components of the lower layer are below the threshold. The decoder may be configured to utilize a first interpolation filter with shorter taps (e.g., a lower cutoff frequency) than a second interpolation filter for regions with high frequency components below a specified threshold except for at least inter blocks where a non-causal neighbor of the inter block comprise one or more intra coded blocks. Exempting inter blocks where a non-causal neighbor of the inter block comprise one or more intra coded blocks may help prevent the propagation of error in the presence of intra coding. The power are adaption controller may be configured to determine a resolution to request for the subsequent segment based on the complexity information from the MDF, the statistics for the previous segment decoding, and the current power information. The resolution may be requested at a specified complexity level. The complexity level may correspond to the level of detail at which the encoder performed encoding.

A method for a wireless transmit receive unit (WTRU) to interact with a video server to dynamically save power during video decoding is disclosed. For example, may dynamically update determinations regarding the amount of power remaining for decoding and determine the appropriate complexity level to select for a video segment based on the updated determinations. As an example, the WTRU may request a MDF from the video server. The WTRU may receive the MDF from the video server. The MDF may include complexity information for decoding one or more segments of a video stream. The WTRU may determine an amount of energy to be allocated for decoding video segments of the video stream based at least in part on an amount of remaining energy allocated for decoding a remainder of the video stream. The WTRU may determine a first decoding complexity level to request for a first video segment of the video stream based on the amount of energy to be allocated for decoding video segments of the video stream. The WTRU may request the first decoding complexity level for the first video segment. The WTRU may re-evaluate the amount of remaining energy allocated for decoding a remainder of the video stream and may determine that the WTRU lacks enough energy to complete the decoding of the video stream at a current energy level per video segment.

The WTRU may determine a new amount of energy to be allocated for decoding remaining video segments of the video stream based on a new amount of remaining energy allocated for decoding the remainder of the video stream. The WTRU may determine a second decoding complexity level to request for a second video segment of the video stream based on the new amount of energy to be allocated for decoding remaining video segments of the video stream. Each of the remaining video segments may be allocated an equal amount of energy based on the new amount of remaining energy allocated for decoding the remainder of the video stream. A respective complexity level for a respective video segment may be selected based on an amount of energy allocated for decoding video segments, a duration of the respective video segment, and statistics associated with energy utilized for decoding at least one previous segment, complexity level for the at least one previous segment, and duration of the at least one previous segment. The WTRU may report power usage statistics for various decoded segments to the server, and the WTRU may receive a video segment of a given complexity based on the report.

BRIEF DESCRIPTION OF THE DRAWINGS

A more detailed understanding may be had from the following description, given by way of example in conjunction with the accompanying drawings wherein:

FIG. 2 illustrates the trend of the increasing number of mobile users.

DETAILED DESCRIPTION OF ILLUSTRATIVE EMBODIMENTS

Figure 1A:
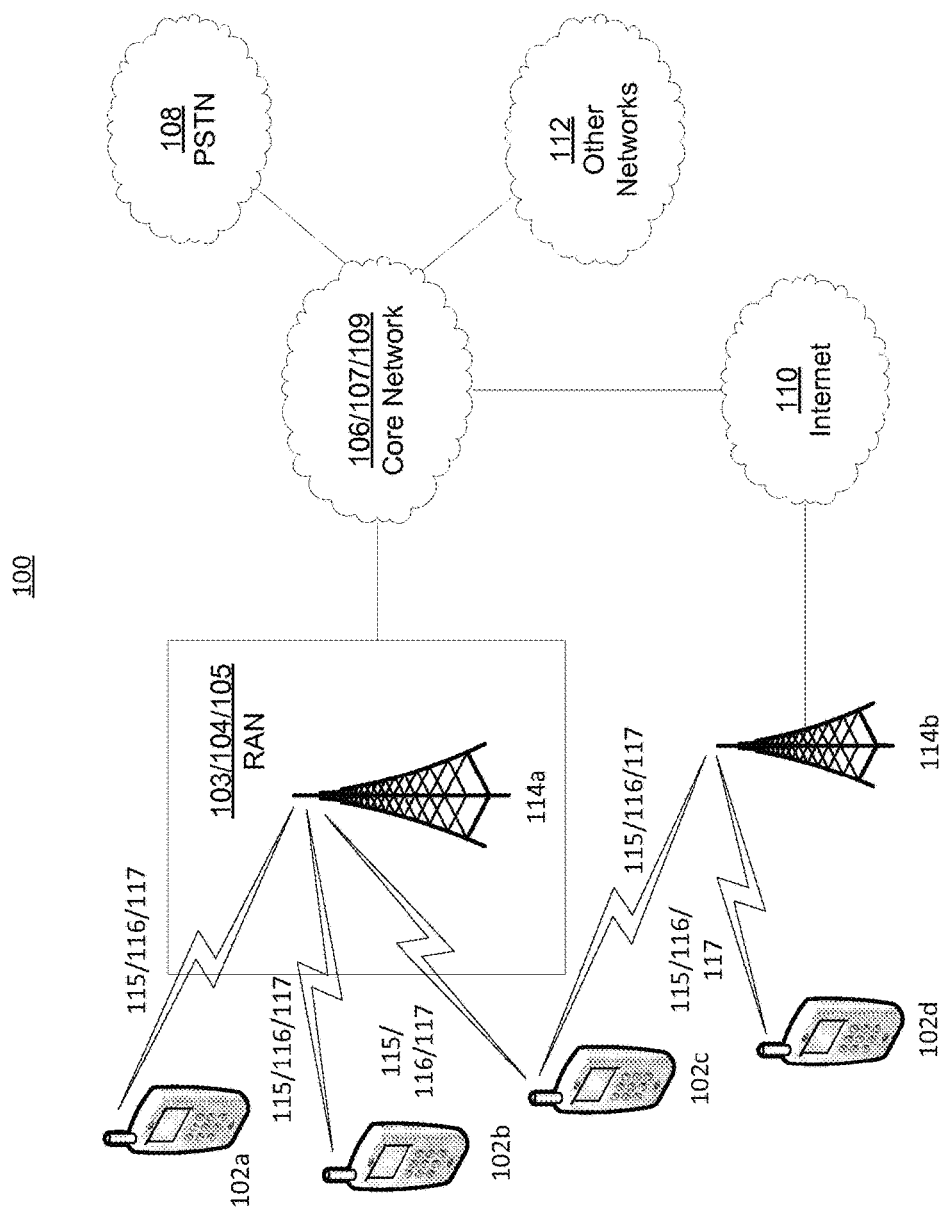
FIG. 1A is a system diagram of an example communications system in which one or more disclosed embodiments may be implemented.

In recent years, mobile devices have become the computing platform of choice for a wide variety of users and applications. For example, the fast evolution of practical System on a Chip (SoC) integrated circuits has allowed mobile devices to increase their available functionality while remaining at a size that makes them practical for handheld use. Recently, ICs have greatly increase the computation capability of mobile devices, for example in terms of CPU frequency and/or number of available processing cores. Additionally, increases in the bandwidth and/or overall data rate of wireless networking technologies (e.g., 4G LTE, HSPA+, WiFi etc.) have allowed mobile devices to obtain media at speeds comparable to traditional broadband Internet access.

Such advancements are some of the reasons for the high adoption rate of mobile devices, leading to an increasingly large number of devices in deployment. FIG. 2 illustrates how the number of mobile internet users continues to increase over time. For example, as illustrated in FIG. 2, it is estimated that the number of mobile Internet users may soon outnumber the number of desktop Internet users. Such a trend may indicate that previous content delivery and processing systems that were optimized for a desktop environment should be revisited in order to optimize performance for mobile Internet traffic. For example, one feature of mobile computing that may have contribute to its tremendous growth in recent years may be that mobile users can access services and/or content essentially anytime and/or anywhere using their mobile device.

The distribution and/or display of media content to/at a mobile devices may raise or cause complexities that may be less of an issue at a traditional desktop device. For example, despite recent advances, some mobile devices may still lack resources to perform complex processing in a timely manner as compared desktop environments. Additionally, size constraints may result in some mobile devices having less processing capabilities and/or fewer hardware modules than are available at traditional devices. Additionally, many types of mobile devices may be powered constrained since they may operate utilizing a battery power source during normal operation as compared to a fixed power source via an electric grid. To facilitate the delivery and/or display of media content at mobile devices of varying complexity and/or with varying capabilities, techniques are being developed to enhance content distribution on mobile platforms. As an example, HyperText Markup Language 5 (HTML5) is a markup language for webpages that has been designed in part to attempt to make media access easier for mobile devices. For example, HTML5 has been designed to use dynamic page layout design support, which may aid mobile devices in retrieving and rendering media content.

One example use case where mobile devices have seen a large increase in Internet traffic is in mobile video content generation and delivery. In order to effectively and efficiently generate, process, distribute, and/or display the mobile video traffic, techniques may be specified for optimizing video processing at mobile devices. For example, as the hardware included on mobile device becomes more powerful, WTRUs may be configured to perform increasingly complex processing in order to stream and/or decode video traffic.

Additionally, advancements in mobile displays have also influenced the high rate of adoption of mobile devices for displaying video. For example, 720p video quality is relatively widespread for mobile devices (e.g., such as smart phones and tablets) for displaying video content. Some higher-end tablets may even be capable of receiving and displaying 1080p video and beyond. Additionally, LCD enhancements have allowed mobile devices to enhance the color levels and/or contrast levels that may be used for video display. Other advanced display techniques may include the introduction of three-dimensional (3d) displays (e.g. autostereoscopic 3D) for mobile devices. When used in conjunction with advanced wireless communication networks (e.g., 4G LTE, WiFi wireless networks, etc.), mobile device users may be able to access high quality video services relatively easily.

Further, mobile devices may be configured to integrate one or more functional modules together on a single platform. For example, a typical mobile device may include one or more of a touchscreen, a digital camera, a global positioning system (GPS), a gravity sensor, and/or other features or technologies. Such elements may compete with each other for mobile processing resources, which may complicate the display of video content. Using one or more of these features substantially simultaneously may adversely affect power usage at the mobile device, leading to a decrease in the amount of video that may be displayed per battery charge. Such power usage is an important consideration for mobile devices since they are often power constrained due to the limited amount of energy available at the battery.

As mobile devices are configured to perform more processing intense methods for video streaming and/or decoding, there may be tradeoffs in terms of power and mobile resource usage. The methods and systems disclosed herein take into consideration energy usage and/or energy level (e.g., power usage and/or power level) during video decoding and/or video streaming processes in order to display video of an appropriate quality in power constrained settings. For example, in order to offer high quality mobile video services on those resource-constrained, heterogeneous mobile devices, factors such as one or more of display size, processing capabilities, network conditions, battery levels, and/or the like may be considered and utilized to affect video coding and/or streaming processing at the mobile device and/or within an advanced communication network.

For example, video streaming is an example method to provide video services to one or more mobile devices via communication networks. Examples of video streaming modes may include push modes and/or pull modes. For example, a streaming system utilizing a video push mode may deliver video data using real-time transport protocol (RTP). Push mode video streaming may apply real-time control protocol (RTCP) functionality to monitor and/or control the Quality Service (QoS) associated with the video.

Methods and systems are disclosed for providing client and/or server based techniques for improving the power efficiency of video decoding. The methods and systems may include the use of power aware streaming and/or power aware decoding. For example, decoding a video may include receiving a media description file (MDF) and/or other in-band or out-of-band information that indicates complexity information for a video stream from a video server. Complexity information may refer to the relative amount of processing resources and/or relative amount of processing power that a decoder would utilize in order to decode a given video or segment. For example, a more complex segment may utilize more processing resources and/or more energy to decode than a less complex video or video segment. Complexity information for the video stream may be determined based on the MDF. In an example, the complexity information may be embedded in the video stream, for example using Supplemental Enhancement Information (SEI) messaging in a video bitstream and/or using other embedded metadata. For example, the complexity information may be signaled using RTP Control Protocol (RTCP). The mobile device may decode the video stream using the complexity information. The complexity information may be provided per video segment. Decoding the video stream using the complexity information may include decoding the video stream using the complexity information while remaining within a given power consumption level.

For example, the MDF may be a Media Presentation Description (MPD) file. The MDF may include one or more of a quality level, a bit rate, and/or the complexity information. The complexity information may be applicable to a plurality of complexity levels. The decoding of the video stream may include performing decoding using different parameters depending on a given complexity level for a given segment. The method may include determining the power allocation for future decoding of the video stream based on previous power dissipation statistics. Loop filtering may be performed, for example depending on the available power at the mobile device. The loop filtering may include one or more of deblocking, utilizing a sample adaptive offset (SAO), and/or adaptive loop filtering (ALF).

In an example, short-cut decoding may be performed. Performing short-cut decoding may include one or more of applying different interpolation filters in different characteristics areas, skipping deblocking operations in one or more areas where blocking artifacts are less visible or where error propagation is less problematic, and/or applying a smaller transform size according to the nonzero coefficient distribution. By taking into account the relative energy level remaining and/or the power level available at the mobile device during video streaming and/or video decoding, devices capable of performing complex and power intensive streaming may be able to receive high-quality, processing intense video feeds, while power constrained devices may still receive video a specified minimum quality while limiting overall power consumption.

Figure 3:
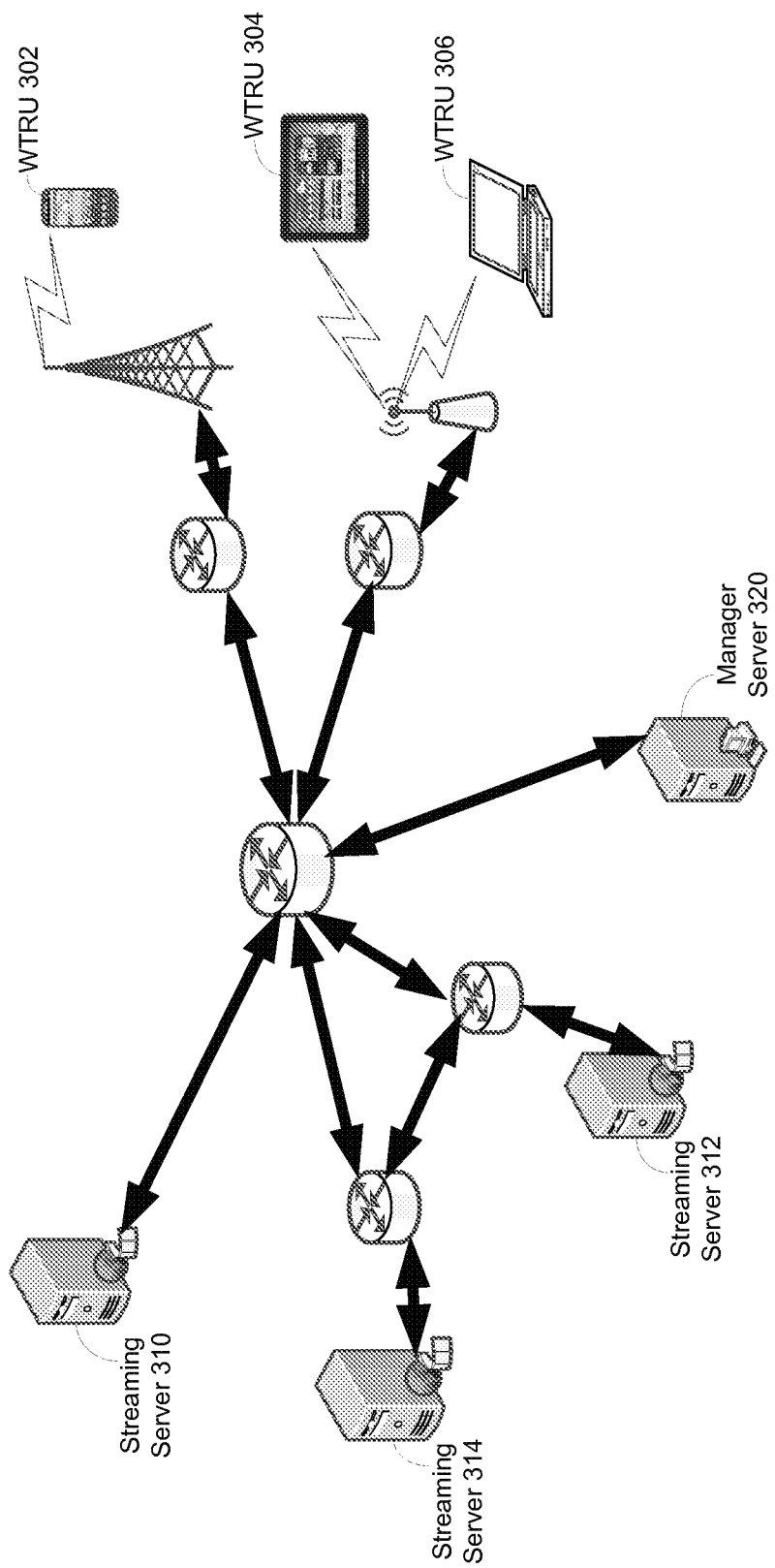
FIG. 3 illustrates an example push mode video streaming system.

FIG. 3 illustrates an example architecture for a push mode video streaming system. For example, as shown in FIG. 3, Manager Server 320 may be configured to manage administration based on user requests. Users may perform request using mobile devices such as one or more of WTRU 302, WTRU 304, and/or WTRU 306. Manager Server 320 may be configured to assign a user request to one of streaming servers (e.g., Streaming Server 310, Streaming Server 312, Streaming Server 314, etc.). Various requests may be distributed to one or more streaming servers in order to balance system load (e.g., admission control). In an example, one or more streaming servers may initiate a streaming session.

A streaming sever providing a streaming video session may control one or more of the aspects or parameters associated with the streaming session, for example in terms of bitrate, resolution, stream switching, and/or the like. The client(s) (e.g., WTRU 302, WTRU 304, WTRU 306, etc.) may decode the video data after receiving video data from streaming server. The client(s) (e.g., WTRU 302, WTRU 304, WTRU 306, etc.) may periodically report statistics such as packet loss, delay, and/or the like to the streaming server that is providing the video stream.

In a many Push video systems, the adaptation logic for a video streaming session (e.g., functionality used to specify the bitrate, resolution, stream switching, etc. based on current conditions) may be located at the server side (e.g., Streaming Server 310, Streaming Server 312, Streaming Server 314, etc.). For example, a streaming server may be configured to perform bandwidth adaption using bitstream (and/or layer) switching according to an available bandwidth reported from a client (e.g., WTRU 302, WTRU 304, WTRU 306, etc.). Such push mode video streaming where adaption is performed at the server-side may allow for lowered transmission loads and/or processing loads at the client, facilitating the use of a relatively small buffer size at the client that since the server can send data in accordance with the determined bitrate relatively continuously and evenly.

In an example, one or more client devices (e.g., WTRU 302, WTRU 304, WTRU 306, etc.) may send a feedback report to the server. The server may set and/or change video parameters based on the feedback report(s) received from the client device(s). However, during periods of increased network congestion, the server may fail to receive the feedback report(s). In addition, RTP protocols, which are often used for Push based video delivery, may be difficult to implement in conjunction with transmission control protocol (TCP)-based delivery systems, and some firewalls may block traffic flows that utilize RTP. In order to provide video of a specified quality, the Push video streaming systems may deploy or utilize streaming servers that are relatively close to users, for example to provide adequate service. Such deployments may make it more difficult to provide the service in large scale and may be more difficult to implement with mobile devices since they may by definition move over the course of the session.

An example of a pull mode streaming system may be playback while downloading. For example, a client device such as a WTRU may download a large media file, for example via hypertext transfer protocol (HTTP). The client may decode a portion of the file while the downloading process is ongoing. However, from the perspective of the service or video provider (e.g., Netflix, Amazon, Google, etc.), it may be undesirable to perform adaptation on a per user basis; instead, such content sources may prefer to use existing Internet infrastructure as-is, and may deploy their service over the top (OTT), which may reduce deployment cost and time.

An example of a pull video streaming technique may include HTTP-based video streaming. Examples of HTTP-based video streaming techniques may include Microsoft's Smooth Streaming, Adobe's Dynamic HTTP Streaming, and Apple's HTTP Live Streaming (HLS). Adaptive sampling methods in HTTP streaming may be utilized. Consortia such as the International Organization for Standardization (ISO)/International Electrotechnical Commission (IEC) Moving Picture Experts Group (MPEG) and/or the Third Generation Partnership Project (3GPP) International Telecommunication Union Telecommunication Standardization Sector (ITU-T) are in the process of standardizing various aspects of adaptive sampling to permit inter-device operable communications.

For example, Dynamic Adaptive Streaming over HTTP (DASH) may be an adaptive approach to video streaming that utilizes HTTP-based streaming methods. DASH has received a large amounts of attention, for example due to the fact that DASH may handle varying bandwidth conditions. One concept implemented in DASH may be to divide a media file or stream into segments that are independently decodable. A portion of content may then be encoded at different qualities or resolutions and separated into segments of equal length. The manner of segmentation and/or other descriptions for how the video was divided and/or information regarding the relative quality of the segments may be include in a XML-based manifest file (MF) to be provided to the client. An example of an MF file may include a Media Presentation Description (MPD) file. A MPD may be an example of of media description file (MDF). Based on the MF file, the client may access the video content using HTTP and may select the segments that are most appropriate given its bandwidth and/or resolution requirements.

Figure 4:
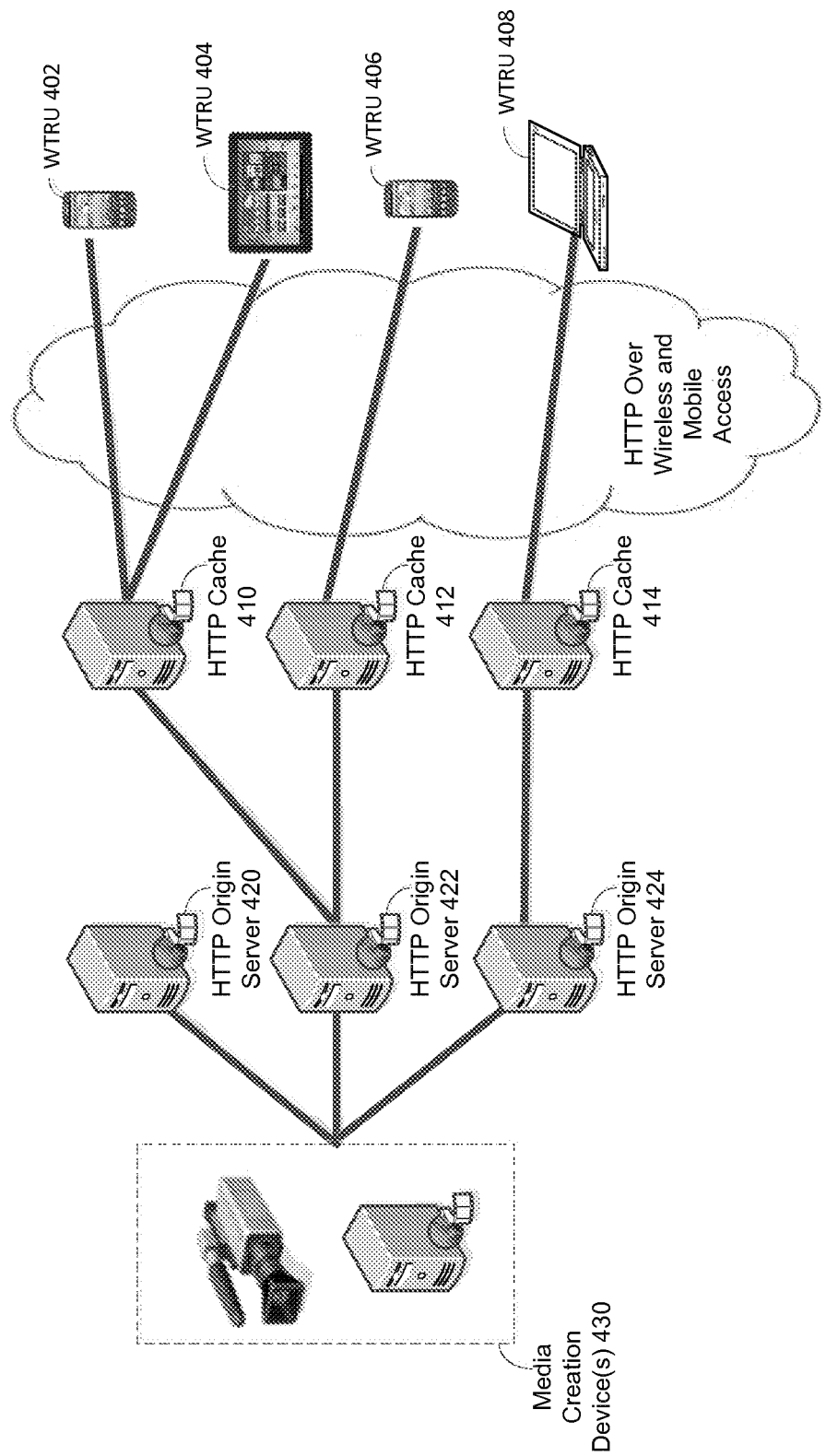
FIG. 4 illustrates an example HTTP based video streaming system.

FIG. 4 illustrates an example HTTP based video streaming system. For example, one or more Media Creation Device(s) 430 may generate a media file such as a video file. The Media content may be compressed and chopped into small segments, for example the one or more Media Creation Device(s) 430 and/or at one or more HTTP Origin Server(s) (e.g., HTTP Origin Server 420, HTTP Origin Server 422, HTTP Origin Server 424, etc.). For example, the segment period may be between 2 and 10 seconds in many streaming systems. The segments may be stored in one or more HTTP Origin Server(s) (e.g., HTTP Origin Server 420, HTTP Origin Server 422, HTTP Origin Server 424, etc.) and may be distributed via a content delivery network (CDN).

For example, at the beginning of a streaming session, one or more client device(s) (e.g., WTRU 402, WTRU 404, WTRU 406, WTRU 408, etc.) may request the MPD file for the media content and may determine which segments to utilize. The decision regarding which segments to utilize may be based the capabilities of the client (e.g., such as one or more of resolution, available bandwidth, and/or the like). One or more HTTP Origin Server(s) (e.g., HTTP Origin Server 420, HTTP Origin Server 422, HTTP Origin Server 424, etc.) may send the requested segments to one or more client devices client device(s) (e.g., WTRU 402, WTRU 404, WTRU 406, WTRU 408, etc.) according to request, for example via one or more HTTP Cache(s) (e.g., HTTP Cache 410, HTTP Cache 412, HTTP Cache 414, etc.). By utilizing one or more HTTP cache server(s) for storing and/or distributing the media segments, the video may be distributed and used by other users such that the system can provide streaming service on a large scale.

Compared to push mode streaming systems, pull mode streaming systems often include the adaption logic for selecting the appropriate segments at the client side (e.g., WTRU 402, WTRU 404, WTRU 406, WTRU 408, etc.). In some scenarios, the caching process used for the distribution of the video segments may be different depending on whether push mode or pull mode is utilized for distribution of the content. For example, since different transport protocols may be utilized for distribution of the content depending on which mode is utilized (e.g., HTTP for pull mode, RTP for push mode, etc.) the caching process utilized may vary based on the type of transport protocol that is used. For example, HTTP was not initially designed for the delivery of real time media; instead, HTTP was designed for best effort delivery of files and other data. Consequently, the HTTP related infrastructure, for example including one or more of cache(s), CDN(s), and/or proxies, may support such file transfer very well, but may be less optimized for the delivery of real-time video content.

Since network address translation (NAT) and/or firewall traversal may or may not apply for HTTP, RTP may be difficult to implement using existing HTTP infrastructure. Additionally, HTTP may add a significant overhead to a streaming session as compared to RTP. In order to utilize HTTP for streaming, the client side (e.g., WTRU 402, WTRU 404, WTRU 406, WTRU 408, etc.) may utilize relatively large buffer sizes, for example since the HTTP transmission rate may not be even over time. For example, the HTTP transmission rate may vary greatly when networks have congestion.

In streaming systems, non-scalable coding may be used to generate different bit streams with one or more of different bitrates and/or different resolutions in order to adapt to bandwidth variation and/or varying display sizes. Additionally, scalable coding techniques may be utilized in order to save transmission bandwidth and/or limit the amount of storage utilized during transmission and/or reception. For example, scalable video coding (SVC) may refer to techniques for encoding a relatively high-quality video bitstream that may also include one or more subset bitstreams. The one or more subset video bitstreams may be determined by utilizing a subset of the packets from the main bitsream during the decoding process. By dropping packets from the larger video bitsream, the subset bitstrens may be used to reduce the bandwidth associated with receiving and displaying the video. In an example, the subset bitstreams may represent a lower spatial resolution (e.g., smaller screen), a lower temporal resolution (e.g., lower frame rate), and/or a lower quality video signal that the main bitstream.

The application running on the client device may determine which of the main SVC bitstream and/or of the one or more subset bitstreams should be decoded based on the rate and/or representation desired by the application. SVC may save bandwidth and storage compared to non-scalable solutions. The international video standards MPEG-2 Video, H.263, MPEG4 Visual, and/or H.264 may have tools and/or profiles that support some modes of scalability. Recently the requirements and use cases of scalable extension of High Efficiency Video Coding (HEVC) have been approved. HEVC may currently be jointly developed by ITU-T Video Coding Experts Group (VCEG) and ISO/IEC Moving Picture Experts Group (MPEG). With scalable video coding technology, bandwidth may be saved for DASH and/or multicasting cases. In DASH systems, an HTTP cache server may cache the base-layer of the video watched by many users, for example instead of caching all or some versions with different bit rates.

Figure 5:
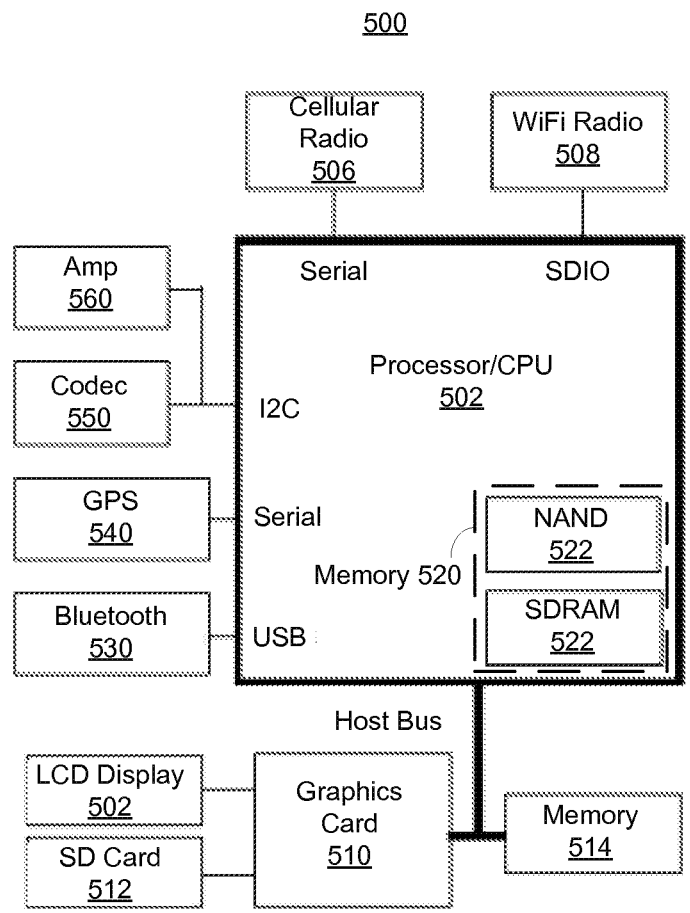
FIG. 5 illustrates an example architecture of a smartphone platform that may be implemented on a mobile device.

Due to factors such as the tremendous increase in the number of applications being executed at mobile devices, power endurance and/or power efficiency of mobile devices has become a critical concern for managing mobile device performance. Various industrial research on power efficiency has been carried out regarding mobile device hardware and power supply design. For example, the power usage for an example mobile platform under various conditions may be analyzed. FIG. 5 illustrates an example architecture of a smartphone mobile device that may be used to perform one or more of the methods described herein. For example, Mobile Device 500 may include Processor/CPU 502, an internal and/or external display such as LCD 504, Memory 520 (e.g., internal/external memory; examples may include NAND flash memory 522 and/or Synchronous Dynamic Random-Access Memory (SDRAM) 522), a Cellular Radio 506 (e.g., GSM/3G/4G, LTE, HSPA+, CDMA2000, etc.), WiFi Radio 508, a Graphics Card 510 (e.g., with Graphics Card Memory 514, and/or Secure Digital (SD) Card 512), Bluetooth Radio 530 (e.g., via a universal serial bus (USB)), internal and/or external GPS 540, Codex 550, Amplifier 560, and/or other various components for receiving/decoding video streams and/or communicating via a wireless network.

Figure 6A:
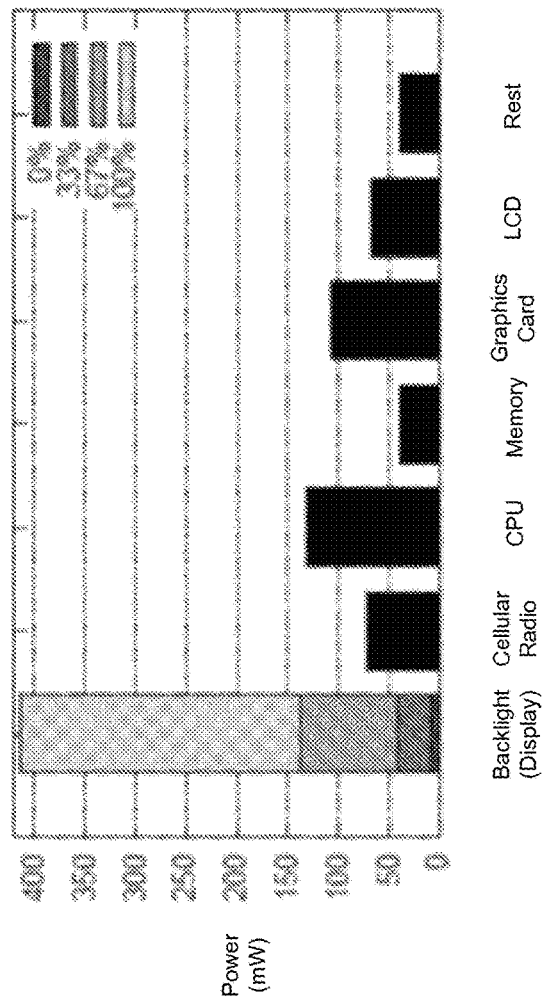
FIG. 6A illustrates an example of power usage in video playback scenario.

Depending of the applications, the power consumption utilized by the carious components of Mobile Device 500 may vary. For example, FIG. 6 illustrates an example of the power usage with a mobile device during a video playback scenario. A may be appreciated from FIG. 6, CPU processing, display aspects (e.g., backlight, graphic card, etc.), and memory access may be the dominate sources for power consumption during video playback. Thus, video decoding may be characterized by applications with relatively high power consumption, for example because video decoding may involve both intensive computation, frequent memory access, and/or relatively constant display usage. Moreover video playback applications may be configured to display the picture at relatively luminance at the display output, which may cause increased power consumption.

During a video encoding and/or decoding process(es), motion compensation may be applied. For example, video coding standards such as MPEG-1, MPEG-2, H.263, H.264/MPEG-4 Advanced Video Coding (AVC), HEVC, and/or the like may utilize motion compensation in order to limit the amount of signaling utilized to communicate video information to a device. Motion compensation may be considered a video compression technique that describes a picture in terms of a transformation or difference with respect to a reference picture. The reference picture may be a previous frame and/or a frame from to be utilized later in time. When images can be accurately synthesised from previously transmitted/stored images, the compression efficiency can be improved.

Motion compensation may be implemented using a linear filtering process. Although larger filter size may achieve better compression efficiency, larger filters may also increase the memory access bandwidth that is utilized during decoding, which may increase power consumption (e.g., increases in memory access bandwidth during video decoding may increase power dissipation at mobile devices). Therefore, a relatively lower power decoder chip may be designed to reduce the memory access bandwidth by compression of the frame buffer, for example by compressing the reconstructed pixels losslessly before storing the reconstructed pixels at the frame buffer. When used for motion compensation, the reconstructed pixels may be fetched from the frame buffer and decompressed for motion compensation.

Figure 6B:
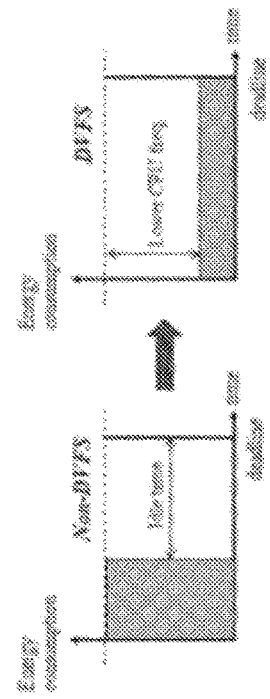
FIG. 6B illustrates dynamic voltage and frequency scaling.

Example methods to manage power for video decoding may include changing the system status adaptively and/or switching the processor frequency adaptively (e.g., dynamic voltage and frequency scaling (DVFS)). FIG. 6B illustrates energy consumption in the presence and absence of DVFS. DVFS may be utilized in order to lower the frequency of a processor in order to conserve energy or lower the power consumption of the processor. By utilizing a lower processing frequency, the processor may be able to perform a given task by a given processing deadline (e.g., decode a frame before it is to be displayed) while performing the task using less power than would have been used had the processing been performed at the higher processor frequency. For example, when a mobile device is idle, DVFS may be utilized to transition to a low power state while keeping certain modules running. Additionally, when the frequency of the processor decreases, the voltage corresponding to the supplied power may also decrease accordingly. Therefore, the power consumption may be reduced. For example, the power dissipated by a chip or processor may be expressed as:

$$P=CV^2f \qquad \text{Equation (1)}$$

where C may be the capacitance (e.g., the capacitance being switched per clock cycle), V may be voltage, and f may be the switching frequency. Many CPUs/processors may provide several frequencies that the CPU may operate at, and the application may configure the frequency on the fly as desired.

The decoding complexity may be different for each picture, and the level of complexity may be used to alter the frequency of the processor. For example, if the picture is relatively simple, the frequency may be reduced in order to conserve power. In an example, the picture size may be used to estimate the decoding time associated with decoding the picture. When the picture decoding time is less than the picture duration (e.g., 1/f), then the frequency of the processor may be decreased without affecting the display. The dynamic power range may become smaller with the recent developments in processor and memory technology, and the power usage at idle/sleep mode may become more efficient. These technology changes may limit the effect of DVFS, so the power saving of DVFS may not be as prominent on new mobile platforms compared to older platforms Improving power usage efficiency to prolong the battery endurance is becoming more and more critical for mobile platform design and mobile application design. Software and hardware video decoding is widely used in mobile multimedia applications, and it may be computationally intense to process with high power consumption. The decoding complexity of the video compression standards may also increase gradually in order to get better compression efficiency.

Streaming systems such as DASH focus on network bandwidth variation, but may fail to address the power usage at mobile platform from a system point-of-view. Moreover, adaptive decoding techniques may be used to save power from client-side, but additional power saving may be desirable, especially during periods where additional power is limited (e.g., the battery power level/energy level is close to zero). Additionally, power consumption for different parts of an application may be balanced to ensure the full playback. Methods that focus on client-side power saving may be limited and/or the user experience may be degraded because frame dropping may be applied when there is not enough power for full playback. As disclosed herein, the power usage may be addressed and modified based on the concept of power aware computing. Example methods and systems may include the collaboration between the server and the client. For example, the client (e.g., mobile device) may request streams with different complexities according to current available bandwidth and/or power status.

Clients may be configured to attempt their best effort to decode and playback video once an appropriate bit rate has been determined according to currently available bandwidth. For many video decoders, the decoding and playback may occupy significant percentages of processor resources in order to meet real time processing requirements. Pure client-based systems may be unable to playback smoothly, for example because the processor power level may be insufficient to decode it in real-time. Frame jumping and asynchronous audio and video may be observed in situations where the processor is unable to perform dull decoding during playback. Additionally, client-based systems may reduce the system response speed, which may affect the quality of user experience in multi-task oriented environments. For example, the system response time for user input/output may slow down due to the processor load being full. In such scenarios, task switching may become slower.

In order to conserve power during video decoding, power aware streaming, power aware decoding, and/or forms of short-cut decoding may be utilized in order to achieve better processor load balance and/or power saving. For example, bitstream switching logic or intelligent logic at the client-side of a streaming system may be configured to consider available network bandwidth, current processor load, and/or remaining power together, for example to ensure a minimum quality of user experience. For a mobile devices that primarily rely on dedicated hardware acceleration for video decoding and streaming applications, network bandwidth and power status may be important factors to monitor and to optimize, whereas if the mobile device primarily relies on software for video decoding and streaming, then in addition to bandwidth usage and power level/energy level, processor load and usage due to video decoding may also be considered.

As described herein power aware technologies such as power aware streaming and/or power aware decoding may be utilized in order to achieve power savings for mobile devices, such as WTRUs that utilize video streaming. For example, one or more of power aware streaming and/or power aware decoding may be used to adjust the power usage per segment and/or per picture, for example according to the remaining power and/or power consumption statistics from decoding previous pictures. For example, the mobile device may utilize one or more power metrics to determine an amount of power to be allocated for decoding the remainder of the video stream and/or one or more segments of the remainder of the video stream. The power metric may be any measure of power usage, power allocation, energy usage, energy allocation, complexity information per energy usage, energy usage per video quality, and/or the like that allows the WTRU to estimate energy resources to be used for a future decoding process. As may be appreciated, although power may be a term used herein, the term energy may be substituted for power where appropriate as appreciated by one skilled in the art.

Power aware streaming technology may be performed via collaboration between a server and a client. Power aware decoding may be used as a client-side adaptation technology. For example, the client may request one or more videos or video segments at a determined complexity level based on a determination regarding the power usage at the client and/or the energy level remaining that may be utilized for decoding at the client. In an example, power aware decoding may be a collaboration between the video server. For example, the client may provide the server with one or more parameters related to its current power usages (e.g., current power level, power level previously utilized during decoding, amount of time a current power level may be continued without depleting a current power sources such as a battery, power level previously utilized for decoding a segment of a specified complexity, power statistics for one or more sub-processes or components of the decoding process, etc.), current energy levels (e.g., amount of energy remaining in a power source such as a battery, amount of energy previously utilized during decoding, amount of energy previous utilized for decoding a segment of a specified complexity, energy usage statistics for one or more sub-processes or components of the decoding process, etc), bandwidth information, and/or the like. The server may utilize this information in order to selectively encode one or more segments for use by the client and/or may select a segment of an appropriate complexity level based on the feedback information. In an example, the server may aggregate statistics from multiple clients in order to derive more accurate estimates for the amount of energy utilized for decoding segments of specified complexity levels.

Power aware streaming and/or decoding technologies may be integrated into existing DASH streaming systems and/or other OTT streaming methods. Low decoding complexity presentations may be achieved by complexity aware encoding, coding tool limitations, bit rate reduction, and/or resolution reduction. Power aware decoding may be utilized to achieve a fine granularity, adaptive decoding method. Power aware decoding may be used with software decoding techniques (e.g., a general purpose or specialized CPU and/or processor is configured to perform the video decoding) and/or a hardware decoding chip (e.g., dedicated hardware modules are configured to perform the decoding).

Power aware streaming may be utilized in combination with power saving technologies such as DVFS; for example, the client mobile device may scale down the frequency to save power for the low complexity video segments.

Figure 7:
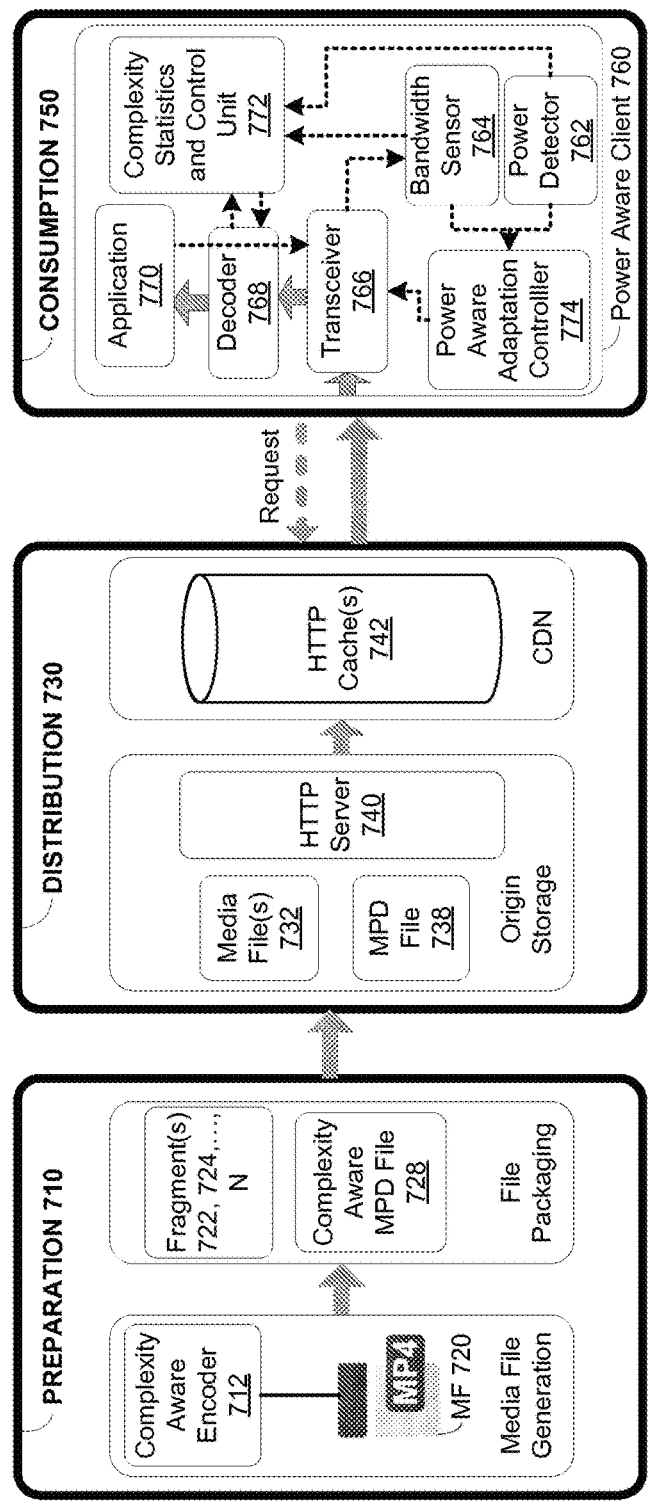
FIG. 7 illustrates an example power aware video streaming system.
Figure 8:
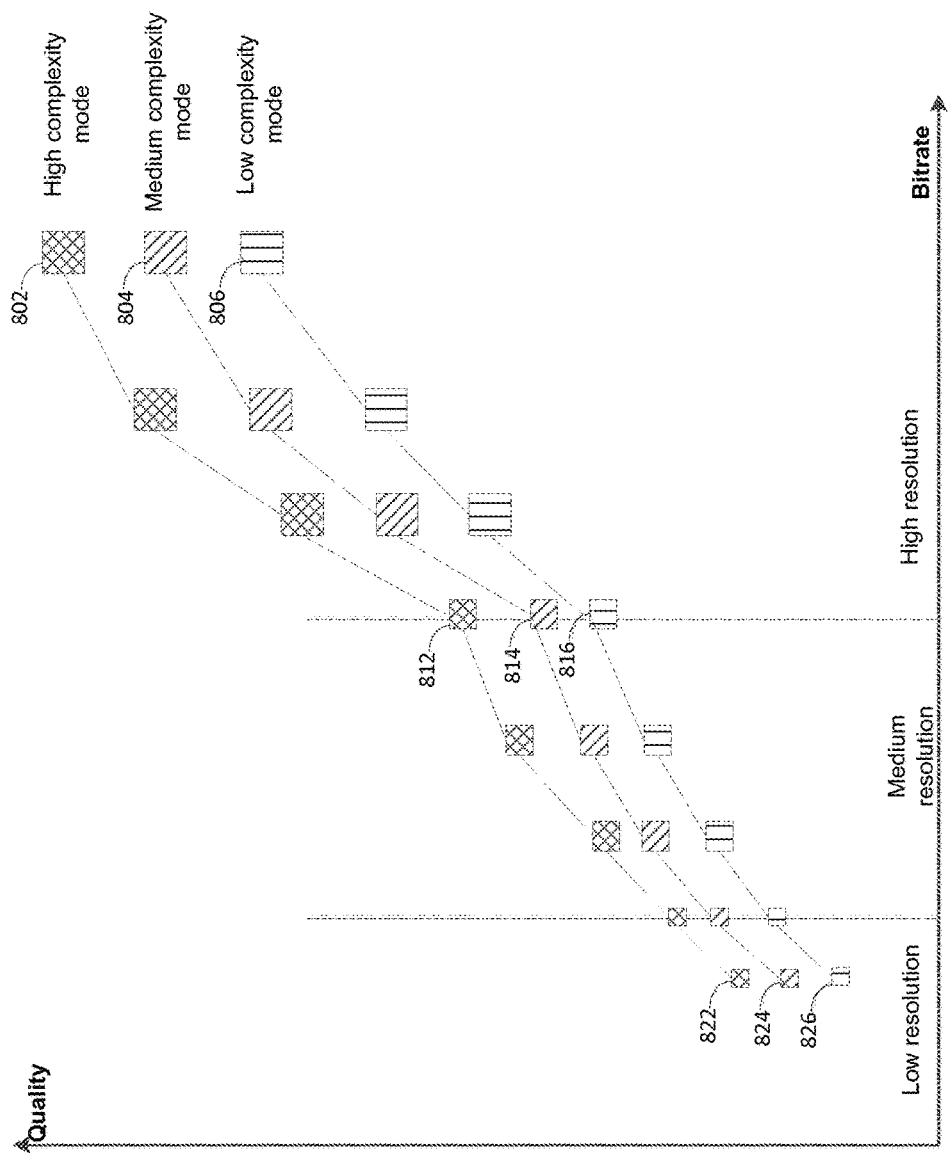
FIG. 8 illustrates an example possible switching operation points at the client side.

FIG. 7 illustrates an example power aware video streaming system. For example, video distribution to a client device (e.g., a WTRU such as a mobile device) may include Video Preparation 710, Video Distribution 730, and/or Video Consumption 750 (e.g., decoding and display). The video encoder (e.g., Complexity Aware Encoder 712) may encode the video file or stream using a plurality of complexity levels. For example, a low complexity level may be less power intensive to decode at the video decoder, but may result in a relatively more distorted version of the pictures included in the video file. A high complexity level may be more power intensive to decode, but may result in a more accurate recreation of the original video. A medium complexity level may be decoded in a less power intensive manner than the high complexity version, but may be more power intensive than the low complexity version. The distortion level associated with the medium complexity level may be between the distortion level of the high complexity level and the low complexity level.

For example, during Video Preparation 710, a source video (e.g., an MP4 or some other Media File (MF) 720) may be generated. For example, Complexity Aware Encoder 712 may generate and encode MF 720. MF 720 may be compressed and divided into small segments with relatively short durations, for example Fragment(s) 722, 724, . . . , N etc. The address and property information, for example including complexity information for one more of the Fragment(s) 722, 724, . . . , N, may be described in a Complexity Aware Media Presentation Description (MPD) File 728. The MF 720 may be encoded using a plurality of complexity levels (e.g., a high complexity level, a medium complexity level, a low complexity level, etc.) and fragments may be generated for encoded versions of MF 720 at each complexity level. Complexity Aware MPD File 728 may include the complexity information for each of the complexity levels used to encode MF 720, and/or there may be a corresponding Complexity Aware MPD File 728 for each complexity level used to encode MF 720.

Once Fragment(s) 722, 724, . . . , N and Complexity Aware MPD File 728 are ready for distribution, Fragment(s) 722, 724, . . . , N and Complexity Aware MPD File 728 may be sent to a distribution server for Distribution 730. For example, one or more Media File(s) 723 may be sent to HTTP Server 740 for distribution. Media File(s) 732 may include one or more Fragment(s) 722, 724, . . . , N and/or other descriptions of the video. Media File(s) 732 may include encoded versions of MF 720 using one or more complexity levels. MPD File 738 may be a copy of Complexity Aware MPD File 728 that is stored at HTTP Server 740. HTTP Server 740 may provide one or more HTTP Cache(s) 742 with copies of Media File(s) 732 and/or MPD File 738 for distribution to client devices.

During Consumption 750, Power Aware Client 760 (e.g., a WTRU, mobile device, and/or other device including a video decoder) may request MPD File 738 from one or more of HTTP Server 740 and/or HTTP Cache(s) 742. Power Aware Client 760 may determine the description information for Fragment(s) 722, 724, . . . , N based on the received MPD File 738. Power Aware Client 760 may determine the complexity levels that are available for the file based on MPD File 738. Power Aware Client 760 may send a requests for one or more of the video segments (e.g., Fragment(s) 722, 724, . . . , N) relatively continuously based on the available bandwidth and/or its current power status. Power Aware Client 760 may request the segments at a particular complexity level, for example based on the current power level and/or the remaining energy available at Power Aware Client 760 (e.g., amount of energy remaining in the battery; amount of processing time remaining given current power usage, etc.). For example, based on the current energy level of the battery being above a first threshold, Power Aware Client 760 may request a first segment at a high complexity level. If the energy level falls below the first threshold (e.g., but is above a second threshold), Power Aware Client 760 may request a subsequent segment at a medium complexity level. If the energy level remaining in the battery falls below the second threshold, Power Aware Client 760 may request another subsequent segment at the low complexity level.

For example, Power Aware Client 760 may include one or more of Power Detector 762, Bandwidth Sensor 764, Transceiver 766, Decoder 768, Application 770, Complexity Statistics and Control Unit 772, Power Aware Adaption Controller 774, and/or other components to receive and process video streams. Power Detector 762 may be configured to determine the current power usage of Power Aware Client 760 and/or the power usage of one or more components of Power Aware Client 760 (e.g., Decoder 768, a display, a CPU etc.). Power Detector 762 may be configured to determine the amount of remaining power available to Power Aware Client 760. For example, if a battery is the power source for Power Aware Client 760, then Power Detector 762 may be configured to determine the amount of power and/or energy remaining in the battery at a given point of time. Power Detector 762 may be configured to determine the amount of time at which Power Aware Client 760 may continue operating under current decoding conditions before the battery is exhausted. Power Detector 760 may be configured to determine the amount of time at which Power Aware Client 760 may operate under assumed or selected decoding conditions before the battery is exhausted.

Bandwidth Sensor 764 may be configured to determine information related to the communication link between Power Aware Client 760 and the source of a video stream (e.g., HTTP Server 740 and/or HTTP Cache(s) 742). Bandwidth Sensor 764 may be configured to determine the available bandwidth for Power Aware Client 760 (e.g., based on the one or more radio access technologies associated with Transceiver 766), the amount of bandwidth available for the communication link between Power Aware Client 760 and the source of a video stream (e.g., HTTP Server 740 and/or HTTP Cache(s) 742), the effective bitrate of the communication link between Power Aware Client 760 and the source of a video stream (e.g., HTTP Server 740 and/or HTTP Cache(s) 742), information related to past bitrates or bandwidths associated with the communication link between Power Aware Client 760 and the source of a video stream (e.g., HTTP Server 740 and/or HTTP Cache(s) 742), and/or other information related to the communication channel between Power Aware Client 760 and the source of a video stream (e.g., HTTP Server 740 and/or HTTP Cache(s) 742).

Complexity Statistics and Control Unit 772 may be configured to store information determined by Bandwidth Sensor 764 and/or Power Detector 762. For example, Complexity Statistics and Control Unit 772 may be configured to store power usage statistics and associate the power usage statistics with the type of decoding that was being performed when the statistics was determined by Power Detector 762. Complexity Statistics and Control Unit 772 may be configured to maintain statistics associated with the communication link between Power Aware Client 760 and the video source (e.g., HTTP Server 740 and/or HTTP Cache(s) 742) as observed by Bandwidth Sensor 764. The stored statistics may be used when determining an appropriate complexity level of an encoded video to be requested.

Power Aware Adaption Controller 774 may be configured to utilize statistics determined by Bandwidth Sensor 764 and/or Power Detector 762 and/or statistics stored by Complexity Statistics and Control Unit 772 in order to dynamically adapt the decoding process being performed by Decoder 768. Power Aware Adaption Controller 774 may interface with Application 770 in order to into consideration application requirements and/or application properties for adapting the decoding process. Power Aware Adaption Controller 774 may be configured to select an appropriate complexity level for a given file or segment of a file based on the current power level/energy level, the current bandwidth, and/or past statistics regarding the power usage, energy usage and/or bandwidth.

Complexity Aware Encoder 712 may be configured to compress source videos during Preparation 710. For example, Complexity Aware Encoder 712 may be configured to encode the video using rate-distortion optimization (RDO). RDO may refer to a method of improving video quality in the presence of video compression wherein the amount of distortion (e.g., loss of video quality; loss of video information) is balanced or optimized against the amount of data bits utilized to encode the video (e.g., the rate). Complexity Aware Encoder 712 may attempt to achieve a highest quality of encoding (e.g., provide the maximum amount of information for decoding) given bitrate constraint(s) without considering the decoding complexity. Thus, the encoder may attempt to maximize a metric comprised of the deviation from the video source due to encoding losses (e.g., distortion) versus the bit cost for a possible decision outcome. Equation (2) may be an example costs metric used to evaluate a cost for a given encoding mode when performing rate distortion optimization.

$$\text{Cost}_{mode} = \text{Dist}_{mode} + \lambda_{rate} \times R_{mode} \qquad \text{Equation (2)}$$

$\text{Cost}_{mode}$ may represent the cost of the encoding mode. $\text{Dist}_{mode}$ may represent the distortion level associated with the encoding mode. $R_{mode}$ may represent the number of encoding bits associated with the encoding mode. $\lambda_{rate}$ may represent the slope of rate distortion curve, which may be related to and/or roughly proportional to the encoding bitrate.

Complexity Aware Encoder 712 may select an appropriate encoding mode in order to minimize the cost metric (e.g., given the bitrate and complexity constraints, Complexity Aware Encoder 712 may select the encoding mode that achieves the lowest relative CDO cost). For example, $C_{mode}$ may be the complexity of the mode measured in CPU cycles, memory access, and/or the like. $\lambda_{complexity}$ may be the slope of complexity vs. distortion curve. Equation (3) may be used to be used to evaluate mode cost in rate distortion optimization when taking into consideration such parameters.

$$\text{Cost}_{mode} = \text{Dist}_{mode} + \lambda_{rate} \times R_{mode} + \lambda_{complexity} \times C_{mode} \qquad \text{Equation (3)}$$

A larger $\lambda_{complexity}$ may correspond to lower decoding complexity. Accordingly, there may be a plurality of possible bitstreams with various complexities that may be generated with different respective $\lambda_{complexity}$ values. The encoder may make each of the bitsreams with the varying complexity levels available to potential clients. The clients may select the appropriate bitstream based on their local power conditions and/or their local bandwidth conditions.

In an example, Complexity Aware Encoder 712 may be configured to compress video streams while adhering to one or more limits with regard to the amount of encoding information provided for various coding tools for different respective complexity levels. For example, Table 1 illustrates examples of coding tools and how the level at which the coding tool may be applied depending on the desired complexity level of the encoded bitstream. Based on the parameters selected for each coding tool, the encoded bistream may be more complex or less complex to decode. In order to generate bitstreams of various complexity levels, the parameters for each of the coding tools may be selected, for example as indicated in Table 1.

Complexity may refer to amount of processing resources utilized to encode/decode the video segment, and may be indicated to the mobile device in an MDF. The complexity information may be signaled as a specific complexity value (e.g., based on a predefined method for determining the value), and may indicate an approximate amount of processing resources at the decoder to be used for decoding a segment. The complexity information may include specific parameters used for performing encoding, such as one or more values for the coding tools indicated in Table 1.

Examples of coding tools may include the level of precision used for encoding motion information, the motion compensation block size, the encoding transform size, the type of in-loop filters that are utilized, the threshold to skip coefficient coding for the block, and/or the like. As illustrated by Table 1, coding parameters and/or the application of one or more coding tools may be restricted according to the desired complexity level of the encoded bitstream.

motion information may be specified to a integer pixel location and when encoding a more complex video stream the precision of motion information may be specified to a factional pixel location. In an example, for a highest complexity level, there may be no limitation on the precision of the motion information, and the encoder may select the level of the precision of the motion information based on what level will cause the least distortion.

In an example, the motion compensation block size to be used for video decoding may by varied. Varying the size of the motion compensation block may increase or decrease the complexity of the video stream to be decoded. By varying the motion compensation block size, the complexity of the decoding scheme may be increased (e.g., non-power limited scenarios) and/or decreased (e.g., power limited scenarios). For example, motion compensation block size may affect the efficiency of memory access. For example, a larger motion compensation block size may reduce the frequency of memory access, but may result in increased distortion. Therefore, when encoding a less complex video stream a relative large motion compensation block size may be utilized and when encoding a more complex video stream the precision of motion information may be specified to a factional pixel location. In an example, for a highest complexity level, there may be no limitation on the motion compensation block size, and the encoder may select the motion compensation block size based on which size will cause the least distortion.

In an example, the transform block size to be used for video decoding may by varied in order to achieve a desired complexity level. The varying of the size of the transform

TABLE 1

Example Coding Tools Applied According to a Desired Complexity Level

| Complexity | Coding Tools | | | | |
| --- | --- | --- | --- | --- | --- |
| | Precision of Motion Information/Vector | Motion Compensation Block Size | Transform size | In-loop filter(s) | The cost threshold to skip coefficient coding for the block |
| Low | integer pixel position | large | smaller size | intra slice | High |
| Medium | integer pixel position, fractional pixel position only in one dimension | medium | small or medium size | intra slice and reference P/B slice | medium |
| High | no limitations | no limitations | no limitations | no limitations | no clipping |

In an example, the precision of motion information and/or the precision of the motion vector to be used for video decoding may by varied. By varying the precision of the motion information, the complexity of the decoding scheme may be increased (e.g., non-power limited scenarios) and/or decreased (e.g., power limited scenarios). Motion information precision in existing coding standards (e.g., HEVC, H.264) may be an example of precision of the motion information/vector. The precision of the motion information/vector may be an integer value (e.g., specified to a given pixel), a half pixel value, a quarter pixel value, and/or to some other fraction of a pixel. Fractional pixel precision may be more complex than integer pixel information due to the application of the interpolation filter and/or due to a larger number of reference pixels being used (e.g., resulting in an increased memory access bandwidth and/or an increase in the number if memory access requests). Therefore, when encoding a less complex video stream the precision of block may increase or decrease the complexity of the video stream to be decoded. For example, HEVC may permit different transform block sizes (e.g., up to a transform block size of 32×32). Larger transform block size may improve compression efficiency while also increasing decoding complexity. Thus, during period limited scenarios (e.g., remaining energy level is below given threshold), a power aware client may request a complexity level corresponding to a smaller transform block size. Table 1 identifies examples values that may be used for transform block size depending on the requested complexity level. For example, if the energy level is above a first threshold, high decoding complexity may be requested (e.g., 16×16 transform block size) and/or there may be no limitations on the transform block size that is utilized. If the energy level is below the first threshold but above a second threshold, a medium complexity level may be requested, and a medium transform block size may be utilized (e.g., 8×8). If the energy level is below both the first threshold and the second threshold, a low decoding complexity level may be utilized, for example by utilizing transform block sizes that a relatively small (e.g., such as 4×4).

In an example, the in loop filters to be used for video decoding may by varied in order to achieve varying complexity levels for video segments. By varying the parameters and/or types of in loop filters that are used, different power levels may be realized during video decoding. For example, in-loop filter(s) may include different restoration tools such as deblocking filter(s), sample adaptive offset(s), adaptive loop filter(s), and/or the like. The deblocking filter(s), sample adaptive offset (s), adaptive loop filter(s), and/or the like may be in a motion compensation loop. The encoder may apply those in-loop filters in various combinations in order to achieve complexity levels that affect the power consumption to be used for decoding. For example, the deblocking filter(s), sample adaptive offset (s), adaptive loop filter(s), and/or the like may be applied at the encoder such that a first stream results in less power intensive decoding (e.g., a lower complexity level) and a second stream results in more power intensive decoding (e.g., a higher complexity level).

As an example, in order to achieve a relatively less complex video segment, predicative coding may be performed using intra slice coding. For example, intra slice coding may be performed without the use of inter slice coding. For example, if a low complexity level is desired, the segment may be coded using intra slice coding. An intra slice (e.g., may be referred to as an I-slice or I-frame) may be decoded without reference to other frames, and thus may be decodable at lower power levels than frames or slices that reference other frames or slices. If a relatively higher complexity is to be encoded, the segment may be encoded using intra slice coding and inter slice coding. Examples of inter slice coding may include the use of P slices (e.g., may be referred to as an P-slice or P-frame) and/or B slice (e.g., may be referred to as an B-slice or B-frame) reference frames. A P-frame reference frame may refer to a that utilizes data from other, previous frames in order to decompress and/or decode the current P-frame. A B-frame may refer to a frame that utilizes data from both previous frames and forward (e.g., future frames) to decompress or decode the current B-frame. The use of inter slice coding (e.g., P/B slices) may increase the processing complexity due to the references to other frames, meaning that power usage during decoding may be increased. Thus, if a lower power level is achieved, the use of P-frames and/or B-frames for inter slice coding may be reduced or stopped.

The encoder may set a cost threshold for determining whether it may skip coefficient coding for a given block. For a low complexity level, the cost threshold may be a relatively high value, while for a higher complexity level the cost threshold may be set to a relatively lower value. In an example, for the highest complexity level, no clipping may be performed. (e.g., skipping of coefficient coding is not performed for the highest complexity level).

The encoder may also determine if it will encode some or all nonzero coefficients received from the transform and quantization for each block of video (e.g., video segment or fragment), for example by considering the quality and decoding complexity. The block cost may be measured based on human visual system (HVS). The block cost may be a weighted sum of nonzero coefficients, for example as illustrated is Equation (4).

$$Cost_{block} = \sum_{(i,j) \in block} W_{i,j} \times \delta_{i,j}, \quad \text{Equation (4)}$$

$$\delta_{i,j} = \begin{cases} 1, & \text{if } Coeff_{i,j} \neq 0 \\ 0, & \text{if } Coeff_{i,j} = 0 \end{cases}$$

$W_{i,j}$ may be a HVS related weight matrix. The weight at low frequency position may be larger than that in the high frequency position. If block cost, $Cost_{block}$, is lower than a threshold that is set to correspond to a given complexity level, then the encoder may skip nonzero coefficient coding. The threshold to control if the encoder skips coefficient encoding may be adjusted given the complexity level.

The complexity information such as $\lambda_{complexity}^{-1}$ and/or an indication of the complexity level associated with an encoded stream (e.g., low, medium, high, etc.) may be added in the media description that is requested by the power aware client. In an example, the client mobile device may consider bandwidth information and/or power status information to determine the bitstream to request (e.g., high complexity, medium complexity, low complexity, etc.). In order to determine an appropriate complexity level to request to for a subsequent video segment, the client mobile device may determine an estimated power to be allocated for the decoding of the subsequent segment. The client mobile device may then determine the appropriate complexity level to request based on a power allocation for a previous decoding process for a segment, the complexity level for the previous segment, and the power level and/or energy level associated with the subsequent decoding. The client mobile device may determine the power allocation information for future video decoding, for example based on the previous power dissipation statistics. If the power is allocated evenly, then the power for next segment may be determined, for example using Equation (5).

$$P_{next} = (T_s/D_r) \times P_r \quad \text{Equation (5)}$$

$P_{next}$ may be the power allocated for the next segment, $T_s$ may be the time duration for next segment, and $D_r$ may be the remaining duration of the video (e.g., or the time duration of the a current or previous segment). $P_r$ may be the total power allocated decode the remaining video (e.g., the amount of power to be allocated for the decoding the remained r of the segments. Based on the power allocated for a subsequent segment, the power used for decoding a previous segment, and/or a decoding complexity of previous segment, the mobile device may determine an appropriate complexity level to request for a subsequent segment, for example using Equation (6).

$$C_{next} = (P_{next}/P_{prev}) \times C_{prev} \quad \text{Equation (6)}$$

$P_{prev}$ may be the power used for previous segment. $C_{next}$ may be the complexity level to be requested for a subsequent segment, and $C_{prev}$ may be the complexity for a previous segment. If the complexity information is signaled by discrete complexity level, the complexity level of next segment may be determined, for example according to Equation (7).

$$C_{next} = \begin{cases} L_0 & \text{if } P_{next}/P_{prev} < Th_0 \\ L_1 & \text{else if } P_{next}/P_{prev} < Th_1 \\ \vdots \\ L_n & \text{otherwise} \end{cases} \quad \text{Equation (7)}$$

Th$_i$ may be the threshold for each complexity level i. According to the estimated complexity level, the client may request the segment which has the closest complexity level as C$_{next}$. Quantizing the complexity levels may lower the overhead associated with indicating the complexity and/or may simplify the encoding/decoding process(es).

FIG. 12 illustrates an example of different complexity levels and resolutions that may be selected by a client device (e.g., mobile device, WTRU, etc.) when performing power aware streaming. For example, generally as the quality level increases, the power utilize to decode the video segment may increase. A client device may receive one or more of quality information for a segment, bitrate information for the segment, complexity information for the segment, and/or other information related to the encoding of the segment from the MPD metadata file. Based on current power constraints (e.g., and potentially based on the current bandwidth), the client device may select an appropriate resolution and/or complexity level for a subsequent segment. In an example, the client device may provide the server with information related to its current power level, current power usage, amount of remaining energy (e.g., battery level), amount of power/energy that may allocated for completing the decoding, current bandwidth, statistics regarding previous decoded segments (e.g., complexity of the previous segment and power utilized to decode the segment, etc.), and/or other information and the server may select the appropriate segment to be sent in the stream.

For example, a mobile device may request a MPD file for a given video. The MPD file may provide complexity information applicable to one or more segments for the video. For example, the MPD file may indicate complexity levels that may be selected by the mobile device and/or may indicate resolutions that may be selected by the mobile device. In an example, at the beginning of the session, the mobile device may select quality level 802, which may correspond to a high resolution segment with a high complexity mode. For example, the mobile device may select quality level 802 based on the power level/energy level remaining for the mobile device being above a first threshold. In an example, the mobile device may select quality level 802 based on a determination that it will be able to decoded the video at quality level 802 without running out of power, for example assuming that each of the subsequent segments are also sent at quality level 802.

The mobile device may continue to monitor is power statistics for decoding and/or its remaining power level/energy level during the video decoding process. For example, after a period of time, the remaining energy level of the mobile device may fall below the first threshold (e.g., but may be above a second threshold). Based on the energy level being below the threshold, the mobile device may request that the next segment be sent using quality level 804. Quality level 804 may correspond to a high resolution segment with a medium complexity mode. By switching to medium complexity mode, power savings may be achieved during segment decoding. If the remaining energy level falls below a second threshold, the mobile device may switch to quality level 806, which may correspond to a high resolution segment with a low complexity mode. If the remaining energy level rises above the given thresholds, and/or if the mobile device is connected to a fixed power source (e.g., a charger or new power source is attached), the mobile device may be triggered to request higher quality segments (e.g., quality level 802).

To achieve additional power savings, in addition to selecting an appropriate complexity mode based on a energy level of the mobile device, the resolution may be selected based on the energy level. For example, if the mobile device has requested quality level 806, but desires additional power savings (e.g., the current power usage may result in the remaining energy being completely utilized during video playback), the mobile device may change to a lower resolution. For example, based on the remaining power falling below a third threshold, the mobile device may request quality level 812, may correspond to a medium resolution segment with a high complexity mode. Similar threshold based analysis may be performed for the medium resolution segments in order to select between quality levels 812, 814, and/or 816. Similarly, if additional power savings are still desired after switching to the medium resolution, the mobile device may select low resolution, and may perform threshold power level and/or energy level analyses to select an appropriate complexity level at the low resolution (e.g., between quality levels 822, 824, and/or 826).

The mobile device may select an appropriate resolution and/or complexity level based on the remaining power, previous statistics regarding power usage, and/or other power metrics. Although high, medium, and low resolutions are shown as examples, there may be many such resolution levels and various combinations of resolution and complexity may result in various levels of power savings. Therefore, the mobile device may estimate the power usage for various combinations of resolution and complexity, and may select the appropriate combination in order to achieve a desired level of power usage during decoding. In an example, if the resolution is quantized between a few distinct levels (e.g., high, medium, low), switching between resolutions may achieve greater power savings than switching the complexity levels (e.g., although this may not always be the case). In these scenarios, the mobile device may switch between the resolutions to achieve larger magnitudes of power savings and may switch between complexity levels within a resolution in order to achieve a finer granularity of power savings.

Power aware decoding may include identifying one or more sub-processes or modules within the decoding process and optimizing or otherwise changing parameters and/or the mode of operation for one or more of the sub-processes in order to minimize power usage while maintaining acceptable video quality and/or user experience. As an example, consider video compression standard HEVC (e.g., although the techniques, methods, and systems disclosed may be applicable to other video compression techniques).

Figure 9:
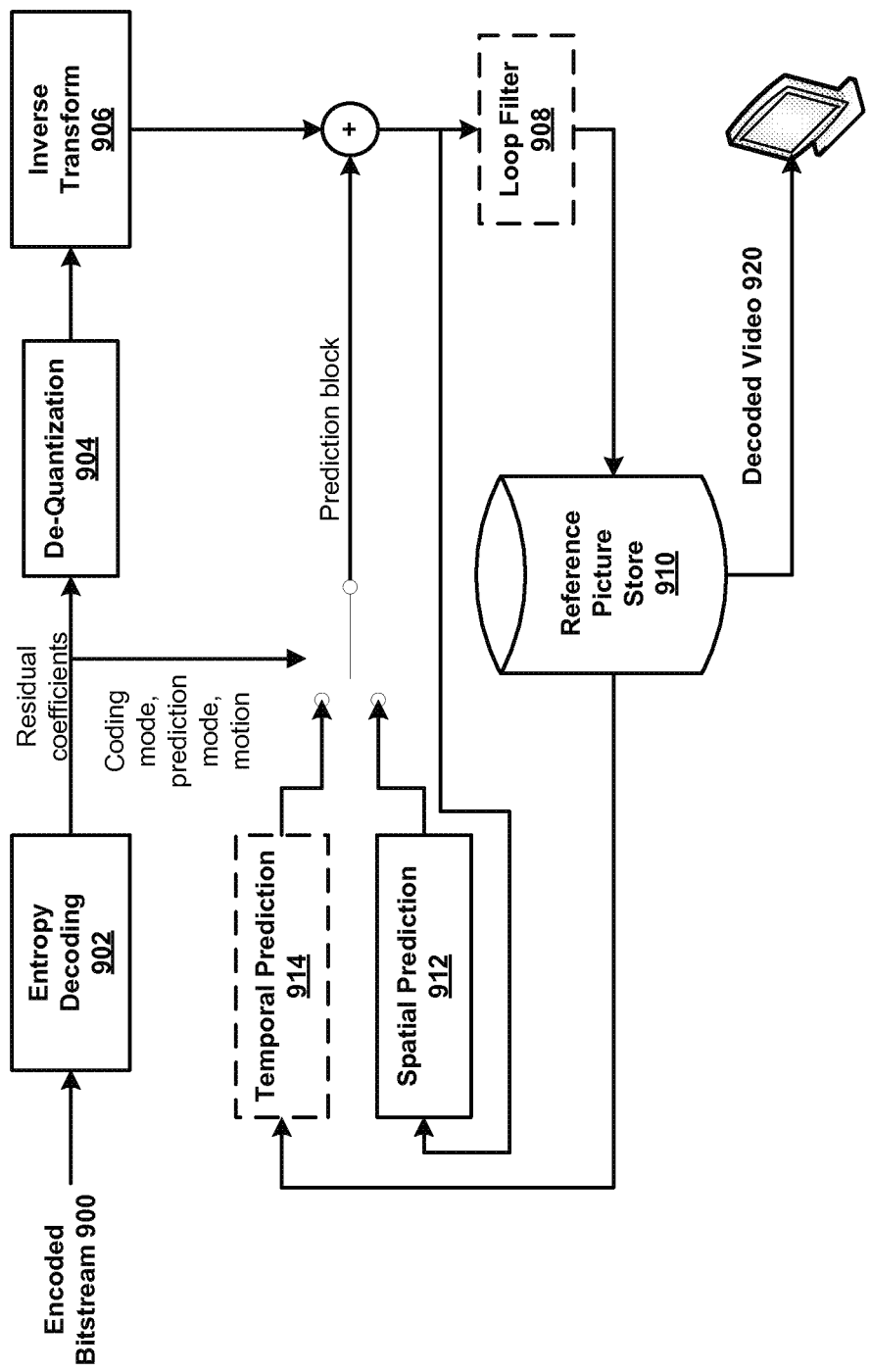
FIG. 9 illustrates example processes in HEVC decoding.

FIG. 9 illustrates an example process for performing power aware decoding using HEVC. For example, HEVC decoding may include Entropy Decoding 902, De-Quantization 904, Inverse Transform 906, Loop Filter 908, Reference Picture Store 910, Spatial Prediction 912, Temporal Prediction 914 (e.g., motion compensation (MC)), and/or the like. In an example, one or more of the components of the decoding process may alter parameters and/or methods that are utilized at the component based on power usage and/or remaining energy level information. For example, Temporal Prediction 914 and/or Loop Filter 908 may be varied in order to achieve a trade-off between quality and power consumption. During periods where additional power savings are desired, Temporal Prediction 914 and/or Loop Filter 908 may be altered in order to save power.

For example, Encoded Bitstream 900 may be unpacked and/or entropy decoded at Entropy Decoding unit 902. The entropy decoding complexity may be highly related to the size of each compressed picture. The more bits used to compress the picture the more power the entropy decoding process may use. The mobile device that includes the power aware decoder may request a bitsream that is encoded using fewer bits in order to save power during entropy decoding. The coding mode, prediction information, motion information, and/or other information determined at Entropy Decoding Unit 902 may be sent to Spatial Prediction unit 912 (e.g., if intra coded) and/or to Temporal Prediction unit 914 (e.g., if inter coded) to form the prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained). Motion compensated prediction may be applied by Temporal Prediction unit 914 to form the temporal prediction block. Temporal prediction (e.g., motion compensation) may account for a relatively large portion of the power usage of the decoder, for example because the temporal prediction may use intensive external memory access for filtering.

The residual transform coefficients may be sent to De-Quantization unit 904 and Inverse Transform unit 906 to reconstruct the residual block. The prediction block and the residual block may be added together to form a reconstructed block. The reconstructed block may be sent to Loop Filter 908 before it is stored in Reference Picture Store 910. The reconstructed video in Reference Picture Store 910 may be used to drive a display device (e.g., Decoded Video 920) and/or used to predict future video blocks.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, scalable video coding technologies may be designed to handle more than one video layer where each layer may be decoded to reconstruct a video signal of a particular spatial resolution, temporal resolution, fidelity, and/or view. Although a single layer decoder is described with reference to FIG. 9, the concepts described herein may utilize a multi-layer decoder, for example, for multi-layer or scalable coding technologies.

Figure 10:
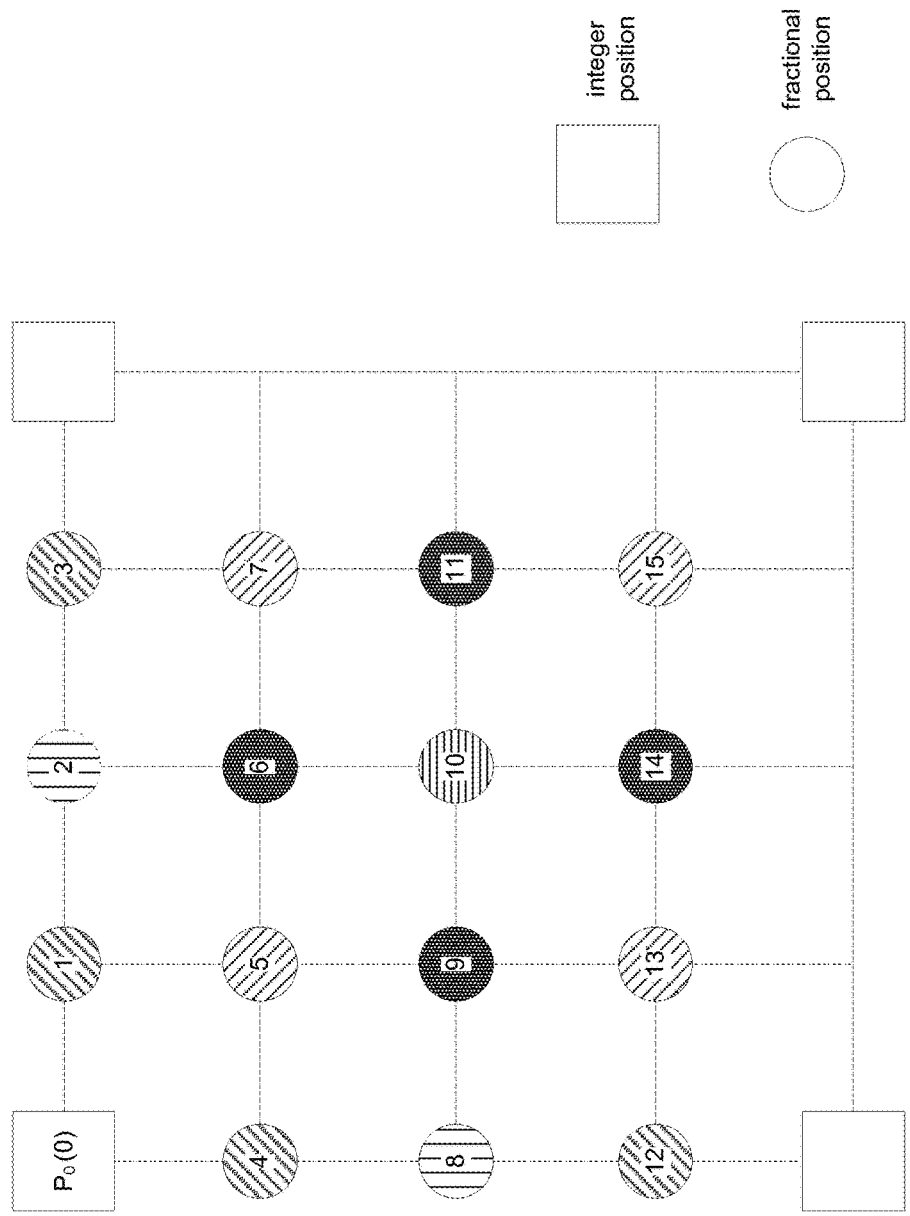
FIG. 10 illustrates examples of different pixel positions for luma MC process.

In example video codecs such as HEVC, at Loop Filter 908 an 8-tap filter may be used for interpolation at half pixel position, and 7 non-zero tap filters may be used for ¼ and ¾ pixel position. If the prediction block size is W×H (e.g., where W may represent the width of the prediction block and H may represent the height of the prediction block), the pixels fetched from the external reference picture buffer may be (W+7)×(H+7) for half pixel position in both the vertical and horizontal directions. FIG. 10 illustrates examples of different pixel positions for luma motion compensation process that may be performed for temporal prediction.

For example, the pixel positions (e.g., fractional pixel positions) may be grouped into a plurality of classes (e.g., 6) shaded as shown in FIG. 10. The pixels positions may be grouped into classes based on the number of pixels used for interpolation filtering at the respective (e.g., fractional) pixel position. For example, Table 2 identifies examples of the classes, the respective pixel positions associated with the classes, the memory size utilized for interpolation filtering during motion compensation for the different classes, and the number of times filter operation is applied for each class. For example, the most complex value may be the (½, ½) position (e.g., position 10 in FIG. 10), as the (½, ½) position may utilize the largest memory size for referencing the reference frame and may involve the application of both a horizontal and vertical filter operation.

If the memory address is arranged horizontally (e.g., which may usually be the case), the memory access efficiency for horizontal interpolation may be higher than vertical interpolation. Loop filtering may include one or more of deblocking, utilizing a sample adaptive offset (SAO), and/or adaptive loop filtering (ALF). Deblocking may be used to reduce the discontinuity at the transform block boundaries, and may have many conditional and comparison operations. SAO may be used to correct the discontinuity at edge points. ALF may be a linear filtering process and may focus on appearance of some or all pixels. These loop filters may be very high power consuming because they may utilize a significant number of pixel based operations.

TABLE 2

Example Memory Size Fetched for W × H block MC

| Classes | Position in FIG. 10 | Memory size | Filter operation times |
|---|---|---|---|
| 1 | 0 | W × H | 0 |
| 2 | 1, 3 | (W + 6) × H | 1 (horizontal) |
|  | 4, 12 | W × (H + 6) | 1 (vertical) |
| 3 | 2 | (W + 7) × H | 1 (horizontal) |
|  | 8 | W × (H + 7) | 1 (vertical) |
| 4 | 5, 7, 13, 15 | (W + 6) × (H + 6) | 2 (horizontal and vertical) |
| 5 | 6, 14 | (W + 7) × (H + 6) | 2 (horizontal and vertical) |
|  | 9, 11 | (W + 6) × (H + 7) | 2 (horizontal and vertical) |
| 6 | 10 | (W + 7) × (H + 7) | 2 (horizontal and vertical) |

Since the complexity of motion compensation may vary based on the position of the fractional pixel position (e.g., based on the size of the memory access and the number of filter operations depending on the class of fractional pixel location), utilizing a subset of the classes may result in less complex decoding. For example, if power savings are desired, the encoder may encode a less complex video segment (e.g., a segment that may be decoded using relatively less energy) by refraining from using one or more classes. For example, the encoder may refrain from using classes where the exclusion of the use of the class during encoding does not significantly affect the rate distortion level. For example, if omitting two classes (e.g., classes 5 & 6) results in a change in rate distortion that is less than a given threshold, the encoder may encode less complex segments without utilizing the omitted classes.

Figure 11B:
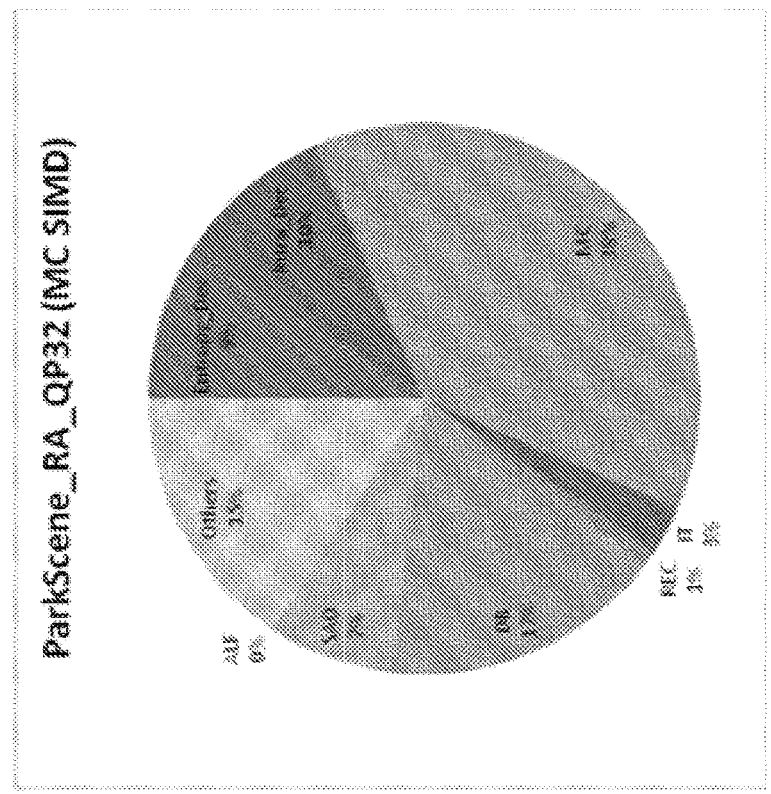
FIGS. 11A and 11B illustrate examples of time profiling for HEVC using HM6.1 decoder and bitstreams coded using random access (RA) setting.
Figure 11A:
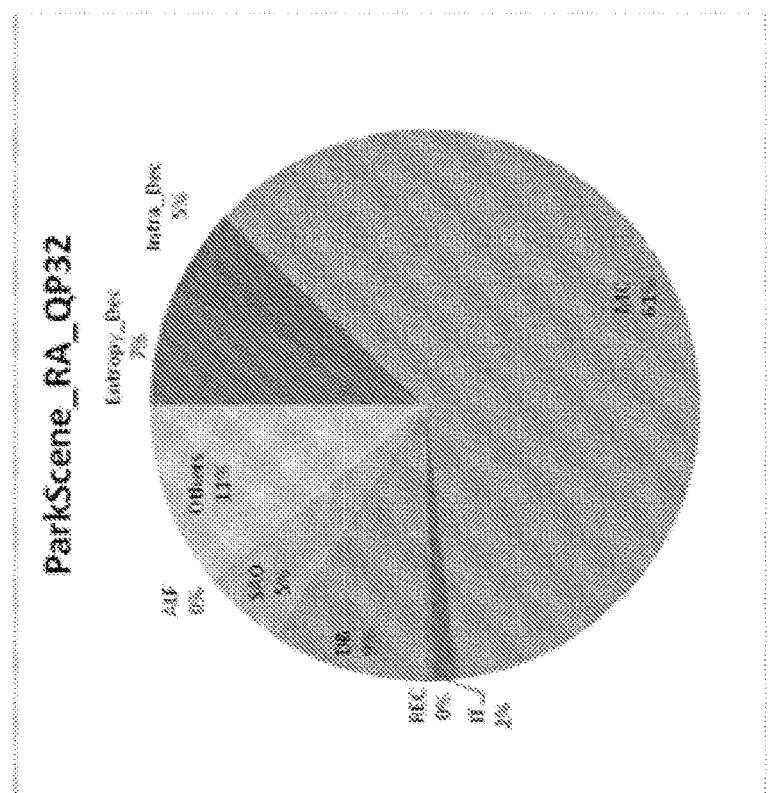

The sub-processes of the decoding process may occupy different percentages of the processors resources and/or make differing amounts of time to complete. For example, FIGS. 11A and 11B illustrate examples of time profiling for HEVC using a HM6.1 decoder and bitstreams coded using a random access (RA) setting. Without the use of single instruction multiple data (FIG. 11A), motion compensation may account for approximately 61% of the decoding time, deblocking and SAO together may occupy approximately 14% (e.g., approximately 9% and 5%, respectively), entropy decoding may account for approximately 7%, for example since the bit rate may be relatively low in this example. SIMD (single instruction multiple data) may accelerate MC greatly, for example up to 2×-3× times. However, MC may still account for 38% of the decoding time (e.g., FIG. 11B).

Figure 12A:
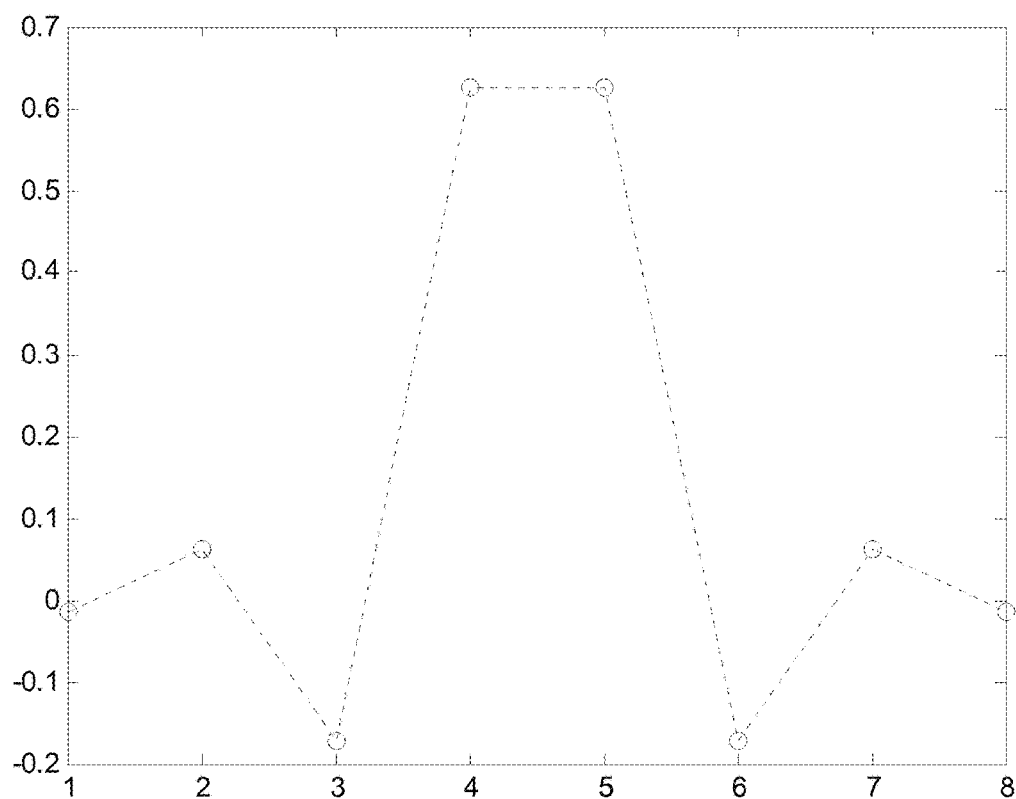
FIG. 12A illustrates an example interpolation filter waveform that may be used for regions with a relatively small portion of the frequency components in the high frequency range.
Figure 12B:
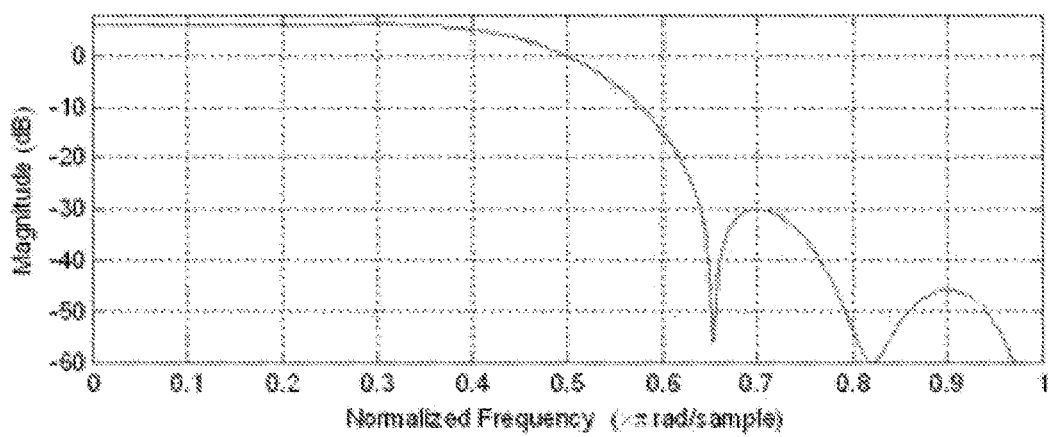
FIG. 12B illustrate an example frequency response for the interpolation filter of FIG. 12A.
Figure 13:
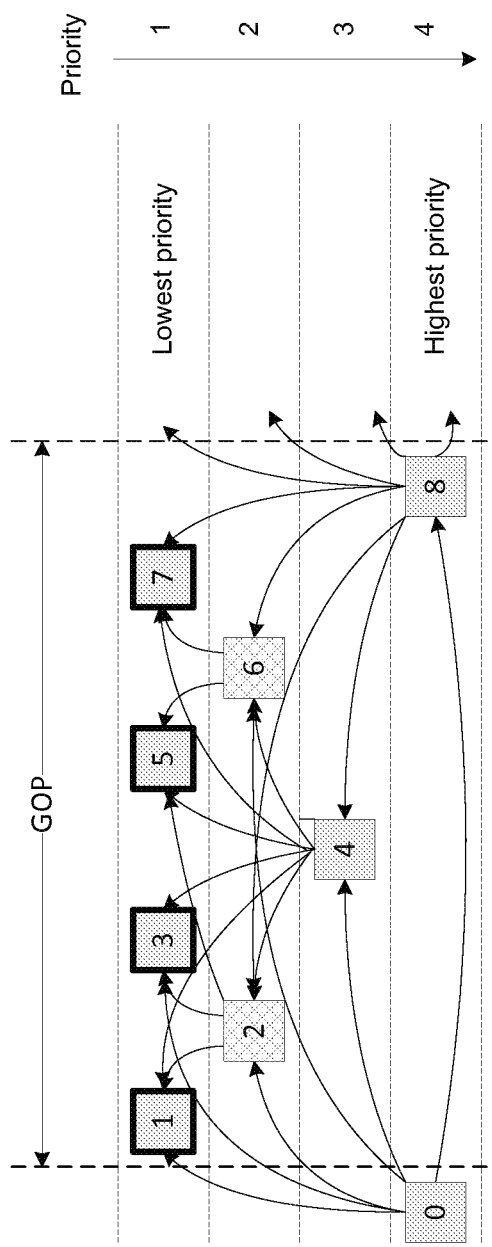
FIG. 13 illustrates an example a hierarchical coding structure in HEVC.

In an example, motion compensation and/or loop filter operation may be modified in order to lower power consumption in a dynamic manner based on current power conditions and/or past power statistics. For example, FIG. 12A illustrates an example interpolation filter waveform for saving power, and FIG. 12B illustrates an example frequency response for saving power. The filter may be a low pass filter. The interpolation filtering process may be implemented in the frequency domain, for example using Equation (8), where X may be the input signal, F may be the filter, and Y may be the output signal in the frequency domain.

$$Y = X \otimes F \quad \text{Equation (8)}$$

In the spatial domain, if the input x does not have a large high frequency signal, the filter F may be shortened without causing large errors. Therefore, the motion compensation utilized may be based on signal frequency analysis. For example, if the region to be interpolated does not have strong edges or strong contrasts (e.g., the frequency response lacks a large proportion of relatively high frequency components), then the power aware decoder in the mobile device may determine to apply a filter with a lower cut-off frequency to save time and/or power during the decoding processes. For example, a shorter (e.g., lower cutoff frequency) filter may reduce memory access bandwidth. The analysis of region characteristics to determine whether the shorter filter may be performed without significantly affecting the decoding processes (e.g., determining whether frequency components of the region are mainly of lower frequency) may be performed using relatively low power. For example, if additional power savings are desired and a given percentage of the frequency components associated with the region are less than a specified frequency threshold, the filtering may be performed using a relatively lower frequency filter.

In an example, the determination regarding whether to apply the lower frequency filter may be performed based on a low resolution images (e.g., analysis is performed on sampled pixels in order to save power). For example, the determination regarding whether to apply the lower frequency filter may be performed based on an analysis of sampled pixels, for example instead of based on all pixels associated with the image or a portion of the image. For example, when analyzing a 16×16 block, pixels at locations (4n, 4m) may be analyzed and considered, where n and m are integers (e.g., the analysis may be performed on 16 pixels to determine the filter to apply for the 256 pixel block).

There may be two issues raised by the lower power motion compensation process. First, error propagation to future pictures due to an error in the temporal prediction process may occur. For example, if an error is introduced in a reference picture due to the use of the lower frequency filter, the error may propagate to future pictures that utilize the reference for temporal prediction. In order to limit the error propagation, in an example the lower frequency filtering may be applied to higher layer pictures but not to lower layer pictures. From example, in HEVC and other video codecs, a hierarchical coding structure as illustrated in FIG. 17 may be used. For example, there may be four layers and pictures at the lower layers may refrain from using pictures in higher layers for temporal prediction. Therefore, in an example by utilizing the lower frequency filter for higher (e.g., highest) layers and/or to layers that are not relied on for temporal prediction by other layers, power savings may be achieved while limiting the effect of error propagation.

Figure 14:
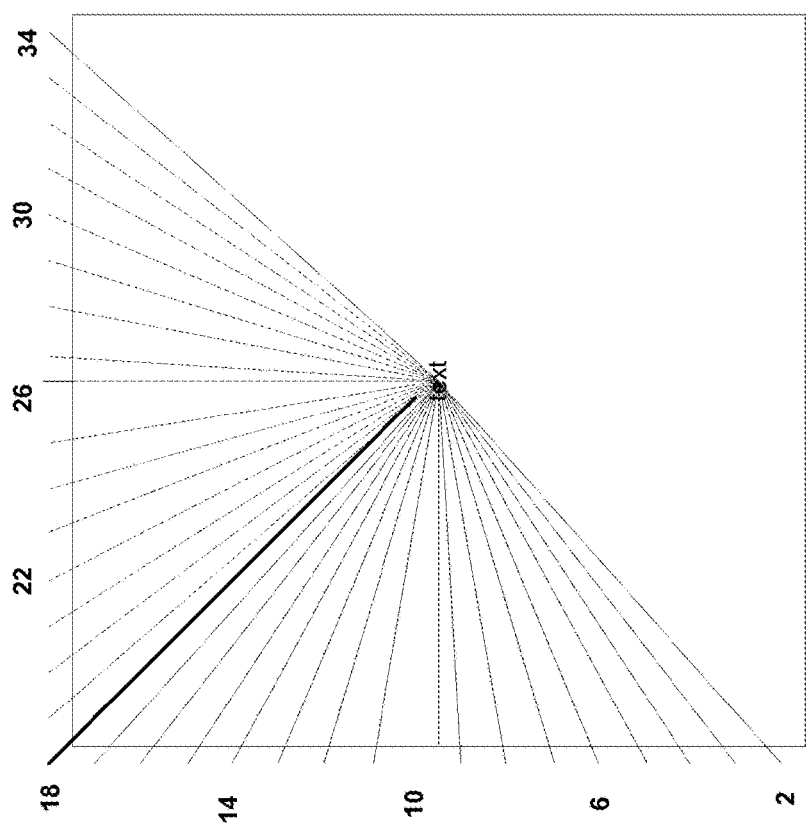
FIG. 14 illustrates example directions used in HEVC intra coding.

A second issue that may be raised due to the use of the lower frequency filter may be error propagation due to intra prediction within the same picture. HEVC, H.264, and/or other codecs may apply directional intra prediction to improve intra coding efficiency. For example, HEVC may utilize directional intra prediction in a plurality of directions. FIG. 14 illustrates example directions used in HEVC intra coding. If an error is generated in the current coding block due to the use of the lower frequency filter, and if a neighboring block to the current block is intra coded, then the error in the current block may be propagated to pixels along the prediction direction in its neighboring block. The error may continue to propagate if there are several intra blocks spatially adjacent to each other, and the artifacts may be magnified. Therefore, in an example the power aware encoder at the mobile device may refrain from using the lower frequency filter for an inter block if there are intra coding blocks in its non-causal neighbors (e.g., its right neighbor block, its bottom neighbor block, and/or bottom right neighbor block). Thus, the mobile even if the mobile device determines that lower power decoding should be utilized, one or more of the coding blocks may still be decoded using a regular motion compensation filter if one or more intra coding blocks are a non-casual neighbor to the respective coding block and/or one or more other coding blocks if a neighboring block is intra coded based on information coded in the respective coding block.

Deblocking may be helpful for improving quality of relatively flat and/or relative smooth areas in terms of visual quality, since blocking artifacts are usually most pronounced in those areas due to human visual system characteristics. For areas with high frequency components such as high texture areas, a phenomenon called texture masking may effectively make blocking artifacts invisible to the human eye. For high texture and/or small residual inter blocks area, skipping deblocking may also save some power. The error caused by skipping deblocking may also propagate by via motion compensation, but the error may not be propagate by intra block prediction. Therefore, in an example if the power aware decoded of the mobile device determines that power savings should be achieved, deblocking may be skipped for non-reference pictures, but may still be performed for reference pictures.

Power aware decoding and/or power aware streaming may be used separately or in combination to achieve power savings using client based techniques (e.g., power aware decoding such as using a low pass filter with a lower cut-off frequency during motion compensation) and/or joint client-network based techniques (e.g., the server provides information regarding the complexity of different potential streams and the client dynamically requests an appropriate stream based on power level information and/or energy level information).

Power aware streaming may be a collaboration between a server and a client (e.g., a WTRU such as a mobile device). For example, content may be generated with multiple versions, and each version may be associated with a different complexity and/or a different resolution. The complexity information may be requested by the client and sent from the server in a media description file for the content. The client may select an appropriate media segment based on information such as the power level status for the client, energy level status of the client, anticipated playback time, the usage status of the processor, user preferences, an indication received from the user, available bandwidth, and/or the like.

For example, a user configures the client mobile device to operate in a high quality mode. In the high quality mode the user may prefer quality over power reduction. When operating in high quality mode, the mobile device may be configured to take into account the complexity levels of the decoding and to determine the resolution and/or complexity level that maximizes the quality while ensuring that the mobile device has enough power remaining to complete full playback of the video. The mobile device may estimate the amount of power that will be used for the remainder of the video based on previous power statistics, complexity information associated with the previous power statistics, and the complexity information associated with the remaining video segments.

In an example, the user may configure the client mobile device to operate in a power saving mode, in which the user may prefer less power dissipation over better quality. In power saving mode, the mobile device may be configured to utilize power aware streaming and/or power aware decoding in order to minimize power usage. Using power consumption statistics learned while decoding previous pictures associated with one or more complexity levels, the client may allocate the power for the next segment according to the remaining power. Based on the allocated power and/or the complexity of previous segment, the client may estimate the complexity of current segment. The client may then know which complexity level should be requested for subsequent segments based on the amount of power remaining.

Power aware decoding technology may be based on content analysis of one or more blocks to be decoded. Power aware decoding may attempt to achieve an acceptable tradeoff between decoding complexity/power usage and quality. Power aware decoding may be able to save power consumption by introducing barely perceptible errors. There may be several methods for power aware decoding. For example, the decoder may apply different interpolation filters associated with different characteristic areas for low priority pictures. For regions with many high frequency signals such as edges or texture with strong edges, the decoder may use a conformant or normal interpolation filter in to avoid introducing errors. For relatively flat regions with fewer high frequency components/signals, the decoder may reduce the low-pass filter cut-off frequency to reduce the memory access bandwidth. In an example, the power aware decoder may save power consumption by skipping deblocking operations in areas where blocking artifacts are less visible and/or in areas where error propagation is less problematic (e.g., such as in non-reference pictures or reference pictures in higher temporal layers). In an example, for an inverse transform, the decoder may apply a smaller transform size according to the nonzero coefficient distribution, for example because most nonzero coefficients may be distributed at the top left corner corresponding to a low frequency region.

A detailed description of illustrative embodiments will now be described with reference to the various Figures. Although this description provides a detailed example of possible implementations, it should be noted that the details are intended to be exemplary and in no way limit the scope of the application.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
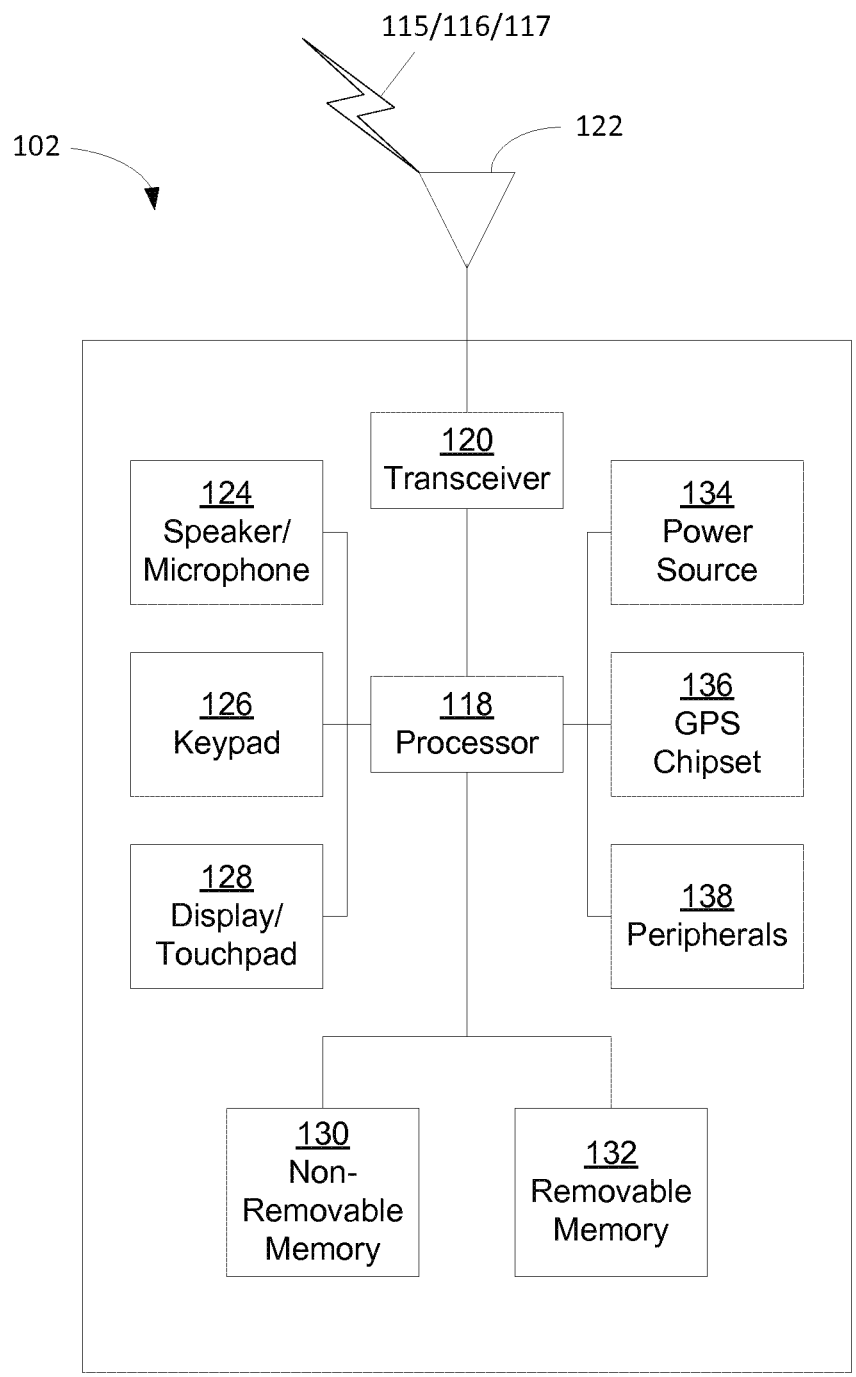
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
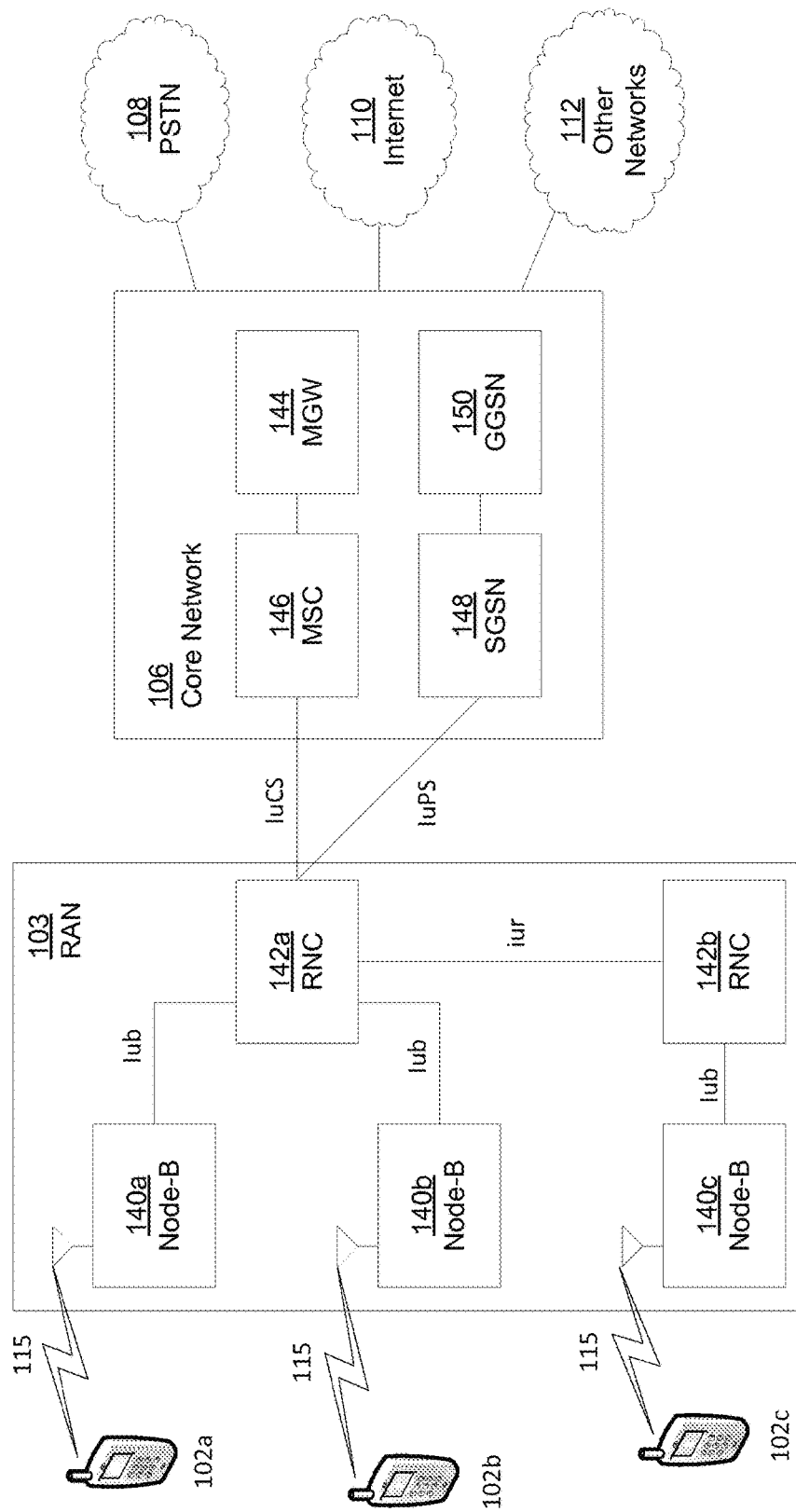
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
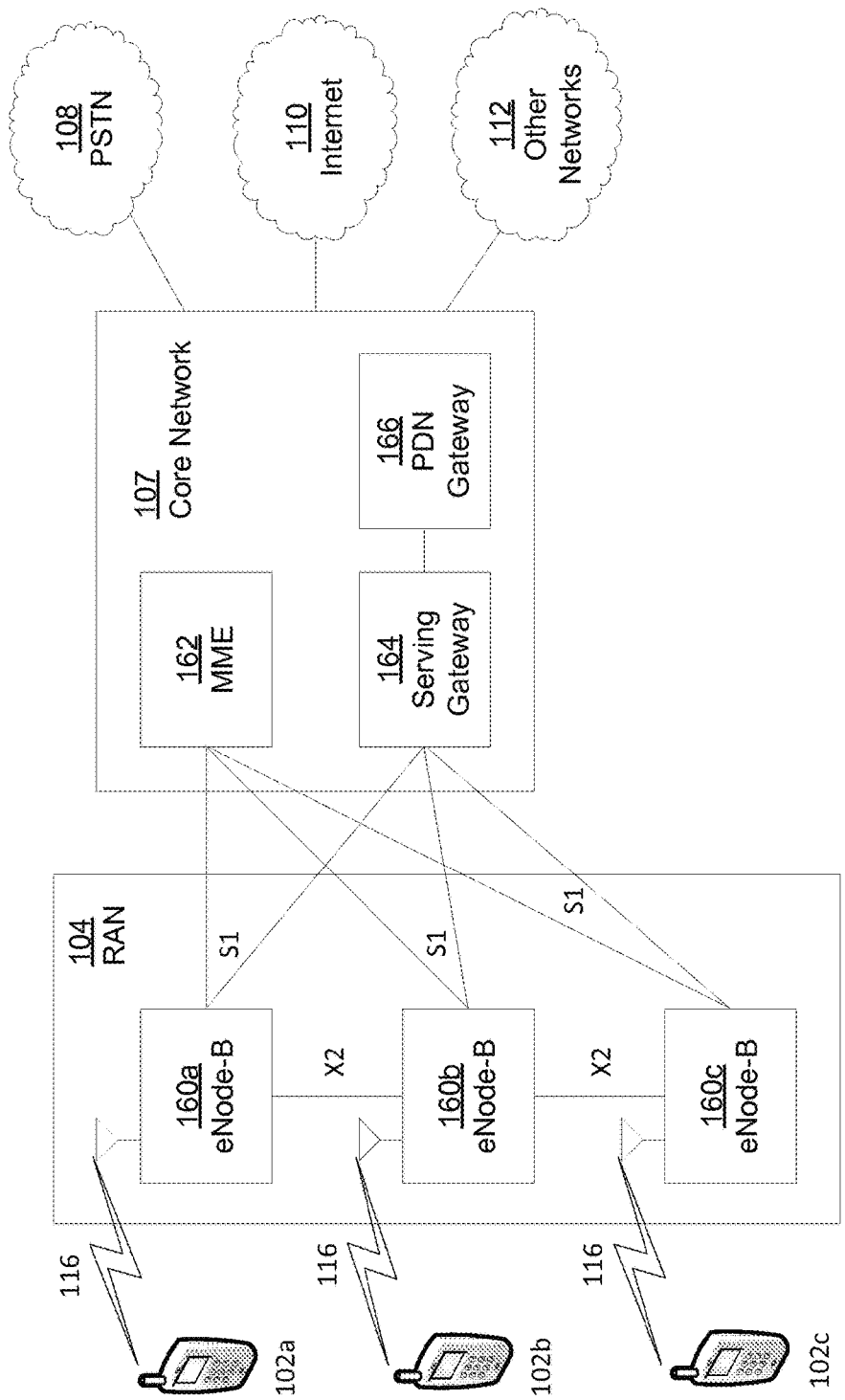
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
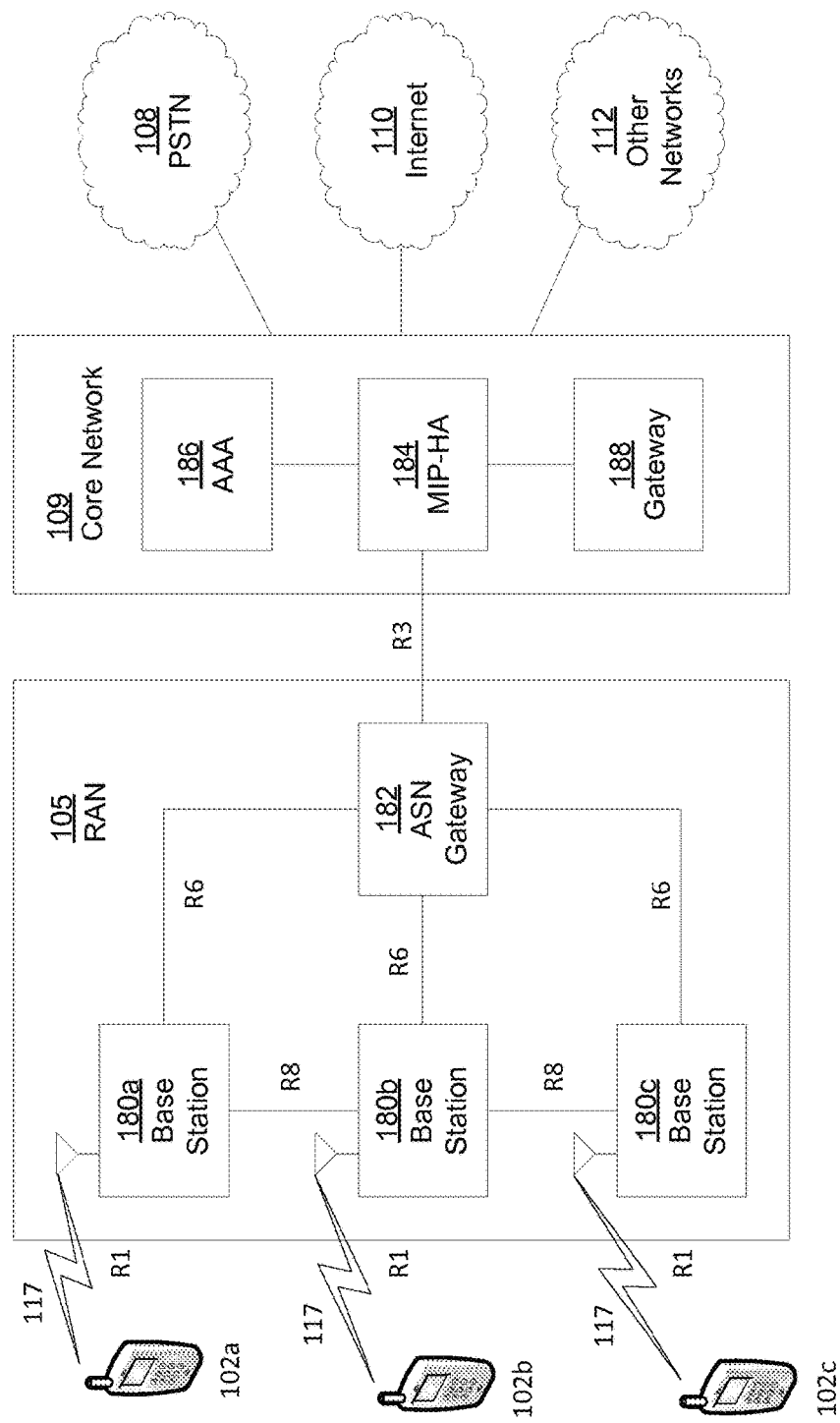
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for a wireless transmit/receive unit (WTRU) to request a video stream from a video server, the method comprising:
   receiving metadata for the video stream, wherein the video stream is divided into a plurality of video segments, the metadata indicating relative video decoding power consumption information for a plurality of complexity levels at which a first video segment can be requested;
   determining an amount of energy remaining in the WTRU;
   determining power allocation information for the first video segment based on the amount of energy remaining in the WTRU and the relative video decoding power consumption information indicated in the metadata;
   determining to request the first video segment at a first complexity level of the plurality of complexity levels based on the power allocation information and the relative video decoding power consumption information indicated in the metadata; and
   requesting the first video segment at the first complexity level.

2. The method as in claim 1, wherein the video decoding power consumption information is provided per video segment in the metadata.

3. The method as in claim 1, wherein the power allocation information comprises a power reduction ratio for the first video segment relative to a previous video segment.

4. The method as in claim 1, wherein a previous video segment was received by the WTRU at a second complexity level of the plurality of complexity levels, and wherein the power allocation information is determined based on a power consumption associated with at least one of decoding or displaying the previous video segment at the second complexity level.

5. The method as in claim 1, wherein the relative video decoding power consumption information for the plurality of complexity levels at which the first video segment can be requested indicates relative amounts of energy that would be used to decode the first video segment at each of the plurality of complexity levels.

6. The method as in claim 1, further comprising estimating, based on the amount of energy remaining in the WTRU, a power available for decoding the first video segment, wherein determining to request the first video segment at the first complexity level of the plurality of complexity levels is further based on the estimated power available for decoding the first video segment.

7. The method as in claim 1, wherein determining to request the first video segment at the first complexity level comprises determining the first complexity level such that decoding the first video segment results in using approximately an amount of energy to be allocated to the first video segment.

8. The method as in claim 1, wherein determining to request the first video segment at the first complexity level comprises selecting the first complexity level based on a power expended while decoding a previous video segment, a complexity level at which the previous segment was requested, and a power allocated for decoding the first video segment.

9. The method as in claim 1, further comprising determining whether a region of the first video segment comprises high frequency components that exceed a high frequency threshold, and applying a first interpolation filter during motion compensation for the region on a condition that the high frequency components exceed the high frequency threshold or applying a second interpolation filter for motion compensation for the region on a condition that the high frequency components do not exceed the high frequency threshold, wherein the second interpolation filter is associated with a lower cutoff frequency than the first interpolation filter.

10. The method as in claim 1, further comprising calculating an amount of power consumed by the WTRU to decode a previous video segment.

11. A wireless transmit/receive unit (WTRU) for requesting a video stream from a video server based on power conditions, the WTRU comprising:
   a memory; and
   a processor configured to:
      receive metadata for the video stream, wherein the video stream is divided into a plurality of video segments, the metadata indicating relative video decoding power consumption information for a plurality of complexity levels at which a first video segment can be requested;
      determine an amount of energy remaining in the WTRU;
      determine power allocation information for the first video segment based on the amount of energy remaining in the WTRU and the relative video decoding power consumption information indicated in the metadata;

determine to request the first video segment at a first complexity level of the plurality of complexity levels based on the power allocation information and the relative video decoding power consumption information indicated in the metadata; and request the first video segment at the first complexity level.

12. The WTRU as in claim 11, wherein the video decoding power consumption information is provided per video segment in the metadata.

13. The WTRU as in claim 11, wherein the power allocation information comprises a power reduction ratio for the first video segment relative to a previous video segment.

14. The WTRU as in claim 11, wherein a previous video segment was received by the WTRU at a second complexity level of the plurality of complexity levels, and wherein the power allocation information is determined based on a power consumption associated with at least one of decoding or displaying the previous video segment at the second complexity level.

15. The WTRU as in claim 11, wherein the relative video decoding power consumption information for the plurality of complexity levels at which the first video segment can be requested indicates relative amounts of energy that would be used to decode the first video segment at each of the plurality of complexity levels.

16. The WTRU as in claim 11, wherein the processor is further comfigured to estimate, based on the amount of energy remaining in the WTRU, a power available for decoding the first video segment, wherein the processor being configured to determine to request the first video segment at the first complexity level of the plurality of complexity levels is further based on the estimated power available for decoding the first video segment.

17. The WTRU as in claim 11, wherein the processor being configured to determine to request the first video segment at the first complexity level comprises the processor configured to determine the first complexity level such that decoding the first video segment results in using approximately an amount of energy to be allocated to the first video segment.

18. The WTRU as in claim 11, wherein the processor being configured to determine to request the first video segment at the first complexity level comprises the processor being configured to select the first complexity level based on a power expended while decoding a previous video segment, a complexity level at which the previous segment was requested, and a power allocated for decoding the first video segment.

19. The WTRU as in claim 11, wherein the processor is further configured to:

determine whether a region of the first video segment comprises high frequency components that exceed a high frequency threshold; and apply a first interpolation filter during motion compensation for the region on condition that the high frequency components exceed the high frequency threshold; or apply a second interpolation filter for motion compensation for the region on condition that the high frequency components do not exceed the high frequency threshold, wherein the second interpolation filter is associated with a lower cutoff frequency than the first interpolation filter.

20. The WTRU as in claim 11, wherein the processor is further configured to calulate an amount of power consumed by the WTRU to decode a previous video segment.

* * * * *